US011619260B2

(12) United States Patent
Borger et al.

(10) Patent No.: US 11,619,260 B2
(45) Date of Patent: Apr. 4, 2023

(54) BEARING, OUTER SLEEVE, AND METHOD FOR PRODUCING A BEARING

(71) Applicant: Sumitomo Riko Company Limited, Aichi (JP)

(72) Inventors: Anton Borger, Deutschland (DE); Martin Mohr, Deutschland (DE); Benjamin Schupp, Deutschland (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/549,890

(22) Filed: Dec. 14, 2021

(65) Prior Publication Data

US 2022/0186778 A1 Jun. 16, 2022

(30) Foreign Application Priority Data

Dec. 15, 2020 (DE) .................. 10 2020 007 681.5

(51) Int. Cl.
*F16C 27/00* (2006.01)
*F16C 27/02* (2006.01)
*F16C 27/06* (2006.01)
*F16C 43/00* (2006.01)
*F16F 1/38* (2006.01)

(52) U.S. Cl.
CPC ............. *F16C 27/02* (2013.01); *F16C 27/06* (2013.01); *F16C 43/00* (2013.01); *F16F 1/3842* (2013.01)

(58) Field of Classification Search
CPC ........ F16C 27/02; F16C 27/06; F16C 27/063; F16C 27/066; F16C 43/00; F16F 1/38; F16F 1/3842
See application file for complete search history.

(56) References Cited

U.S. PATENT DOCUMENTS 5,024,425 A * 6/1991 Schwerdt ............ F16F 13/1481
267/141.1
5,944,297 A * 8/1999 Flower .................... F16F 15/08
248/638

(Continued)

FOREIGN PATENT DOCUMENTS

DE 19755307 A1 * 2/1999 ............. B60K 17/24
DE 69512608 5/2000

(Continued)

OTHER PUBLICATIONS

"Office Action of Germany Counterpart Application", dated Jul. 8, 2021, with English translation thereof, pp. 1-14.

*Primary Examiner* — Phillip A Johnson
(74) *Attorney, Agent, or Firm* — JCIPRNET

(57) ABSTRACT

A bearing (1) is provided, comprising an inner sleeve (6), an outer sleeve (2), and an elastomer body (24), which resiliently interconnects the inner sleeve (6) and the outer sleeve (2), wherein the outer sleeve (2) comprises a circumferential portion (8) and at least one deformation portion (10) that is recessed radially inwards from the circumferential portion (8), and wherein the deformation portion (10) comprises a support-surface portion (12) arranged so as to be offset radially inwards relative to the circumferential portion (8) of the outer sleeve (2), wherein the support-surface portion (12) extends substantially perpendicularly to the radial direction (Ra). A method for producing a bearing is also provided.

18 Claims, 11 Drawing Sheets

(56) References Cited

U.S. PATENT DOCUMENTS 6,017,073 A * 1/2000 Lindblom ................. F16F 1/38
   296/190.07
2014/0091507 A1* 4/2014 Oldfield ................... F16F 1/38
   267/292

FOREIGN PATENT DOCUMENTS

DE    102011053015 A1 *  2/2013   .............. F16F 1/373
DE    102012105236 A1 * 12/2013   ............ F16F 1/3842

* cited by examiner

BEARING, OUTER SLEEVE, AND METHOD FOR PRODUCING A BEARING

CROSS-REFERENCE TO RELATED APPLICATION

This application claims the priority benefits of German application no. 10 2020 007 681.5, filed on Dec. 15, 2020. The entirety of the above-mentioned patent application is hereby incorporated by reference herein and made a part of this specification.

TECHNICAL FIELD

The disclosure relates to a bearing for the substantially oscillation-decoupled support of a component, in particular of a motor or a chassis component, for example for a motor vehicle, to a corresponding outer sleeve, and to a method for producing the bearing.

BACKGROUND ART

A typical bearing comprises an inner sleeve and an outer sleeve, which are interconnected by an elastomer spring. In order to reduce manufacturing-related tensile stresses in the elastomer spring and/or to generate compressive preload in the elastomer spring and to increase the service life of the bearing, the bearing is typically calibrated, wherein the outer sleeve is compressed radially inwards. The extent of the reduction in the tensile stress in the elastomer spring and/or of the generation of the compressive preload is limited in such a calibration, however. In addition, the extent of the calibration always has to be coordinated with the desired movement play of the outer sleeve and the inner sleeve relative to one another. In bearings of this type, in recent times there has been the technical challenge of substantially decoupling the component to be supported thereby from oscillations, which are generated by an internal combustion engine and/or an electric motor during operation of a motor vehicle, for example. In this case, the decoupling of oscillations in different frequency ranges is problematic.

SUMMARY

The disclosure provides a bearing having an improved service life and ease of production, as well as a method for producing a bearing of this kind.

The disclosure can be achieved by providing a bearing and a method for producing a bearing according to the subject matter of the respective independent claims. Preferred embodiments are found in the dependent claims.

One aspect relates to a bearing, comprising an inner sleeve, an outer sleeve, and an elastomer body, which resiliently interconnects the inner sleeve and the outer sleeve. The outer sleeve comprises a circumferential portion and at least one deformation portion that is recessed radially inwards from the circumferential portion. The deformation portion comprises a support-surface portion arranged so as to be offset radially inwards relative to the circumferential portion of the outer sleeve, wherein the support-surface portion extends substantially perpendicularly to the radial direction.

One advantage of the disclosure is that, by providing the deformation portion, significant calibration of the bearing is possible without damaging the outer sleeve and/or the elastomer body. The risk of the elastomer body becoming detached from the outer sleeve during the calibration can be minimized and the outer sleeve can be reliably completely overmolded with elastomer, as is sought in the production process, during the production of the bearing, which also means that the production of the bearing is simplified. Therefore, by means of the configuration according to the disclosure, the bearing can be produced in a simple manner and a preload of the elastomer body, such as its suspension-spring portions, as described below, can be preset and/or tensile stress can be reduced therein, which results in an increase in the fatigue strength of the bearing and thus its service life.

In addition, an advantage of the disclosure is that it is possible to support the deformation portion by the support-surface portion during the calibration from the radial inner face by means of a counterholder. As a result, the deformation of the deformation portion can be influenced in a targeted manner during the calibration. In addition, the deformation portion and/or the support-surface portion can be prevented from being displaced radial inwards during the calibration in order to ensure movement play of the outer sleeve and the inner sleeve (and any potential intermediate sleeve) relative to one another irrespective of the extent of the calibration.

Another advantage of the disclosure is that, by means of the support-surface portion formed on the deformation portion of the outer sleeve, a stop for the radial displacement of the outer sleeve is formed on the sleeve arranged radially inwardly from the outer sleeve, such as the inner sleeve or the intermediate sleeve.

An axial direction within the meaning of the present application is a direction in an extension of a length of the bearing or of the inner sleeve or outer sleeve. When a bearing is substantially cylindrical, the axial direction is oriented substantially in parallel with a relevant surface line or the longitudinal axis of the bearing or of the inner sleeve or outer sleeve. Accordingly, a radial direction is oriented perpendicularly to the axial direction. When a bearing is substantially cylindrical, the radial direction is oriented to coincide with a relevant radius of the bearing or of the inner sleeve or outer sleeve. When an inner sleeve or outer sleeve is substantially hollow-cylindrical, the radial direction extends in the direction of a relevant wall thickness of the sleeve. Accordingly, a circumferential direction is a direction in an extension of a circumference of the bearing or of the inner sleeve or outer sleeve which extends perpendicularly to the axial direction and perpendicularly to the radius.

A cross section within the meaning of the present application is, unless described otherwise, a section through the bearing or a part of the bearing of which the sectional plane extends perpendicularly to its longitudinal axis or axial direction. A longitudinal section is a section through the bearing or a part of the bearing of which the longitudinal axis or axial direction is in the sectional plane.

Within the meaning of the present application, the terms "outer" and "inner" and the like, as used in the following, mean that an idealized or imaginary midpoint is the innermost point. A region that is further out in relation thereto is an idealized or imaginary circumferential region. A point or region that is referred to as being further out than another point or region is therefore further out in the direction of the circumferential region than the other point or region in the radial direction, when starting from the midpoint.

The inner sleeve, the outer sleeve and/or an intermediate sleeve, which is optionally additionally provided, as described below, can also be referred to as "rings" or "bushings" and are substantially in the shape of a hollow cylinder. An outer contour and/or an inner contour of the inner sleeve, the outer sleeve and/or the intermediate sleeve may be substantially circular, oval, elliptical or polygonal in cross section. The inner sleeve, the outer sleeve and/or the intermediate sleeve may be formed as circumferential closed sleeves.

The inner sleeve may be the innermost sleeve of the bearing according to the disclosure. The inner sleeve may advantageously at least partially be composed of a temperature-resistant material, which is suitable for molding an elastomer thereon, for example for vulcanizing rubber thereon. Metal, such as aluminum or steel, or plastics material are possible as the material for the inner sleeve, for example. The inner sleeve may form an inner connection of the bearing, which can be indirectly or directly connected to a first component, such as a motor, a chassis component or a vehicle frame, on which a second component is intended to be supported. In order to do this, the inner sleeve may be designed to comprise a fastening apparatus, such as a fastening hole.

The outer sleeve may be the outermost sleeve of the bearing. The outer sleeve may advantageously at least partially be composed of a temperature-resistant material, which is suitable for molding an elastomer thereon, for example for vulcanizing rubber thereon. Metal, such as aluminum or steel, or plastics material are possible as the material for the outer sleeve, for example. The outer sleeve may form an outer connection of the bearing, which can be indirectly or directly connected to the second component, such as a motor, a chassis component or a vehicle frame, on which the first component is intended to be supported. Alternatively, a fastening sleeve for the outer connection may be arranged around the outer sleeve, wherein the outer sleeve can be pressed and/or adhesively bonded into the fastening sleeve. In this case, the fastening sleeve may form the outermost sleeve of the bearing and the outer connection of the bearing. The outer sleeve surrounds the inner sleeve in the radial direction. The central longitudinal axes of the outer sleeve and/or the inner sleeve may be congruent or may extend in parallel with one another.

The intermediate sleeve may be a middle sleeve of the bearing arranged between the inner sleeve and the outer sleeve. The intermediate sleeve may advantageously at least partially be composed of a temperature-resistant material, which is suitable for molding an elastomer thereon, for example for vulcanizing rubber thereon. Metal, such as aluminum or steel, or plastics material are possible as the material for the intermediate sleeve, for example. As described in the following, the intermediate sleeve may form a damping mass of the bearing. The outer sleeve surrounds the intermediate sleeve in the radial direction and the intermediate sleeve surrounds the inner sleeve in the radial direction. The central longitudinal axes of the outer sleeve, the intermediate sleeve and/or the inner sleeve may each be congruent or may extend in parallel with one another.

The intermediate sleeve may be formed in one piece. Alternatively, the intermediate sleeve may be formed in multiple parts and so as to be interrupted in the circumferential direction. In other words, the intermediate sleeve may comprise a plurality of intermediate sleeve parts, which are arranged so as to be separated from one another in the circumferential direction by a gap. For example, the intermediate sleeve may comprise two, four or six intermediate sleeve parts, which may be evenly distributed over the circumference of the intermediate sleeve, preferably in an axially symmetrical manner with respect to a diameter in cross section and/or so as to be point-symmetrical to the central longitudinal axis of the intermediate sleeve.

The relevant axial extension of the inner sleeve, the intermediate sleeve and/or the outer sleeve is not particularly limited, and may for example be between approximately 10 mm and approximately 250 mm, between approximately 30 mm and approximately 150 mm or between approximately 50 mm and approximately 100 mm in each case. The respective axial extensions of the inner sleeve, the intermediate sleeve and/or the outer sleeve may preferably be substantially the same, but may also differ from one another.

The elastomer body, which resiliently connects the inner sleeve to the outer sleeve, and where applicable connects the inner sleeve to the intermediate sleeve and the intermediate sleeve to the outer sleeve, may for example be made of natural rubber or synthetic rubber. For this purpose, the elastomer body may be formed in one piece or in several pieces. The elastomer body may form the spring body of the bearing and may comprise suspension-spring portions. At least partial overmolding of the individual parts of the bearing with the elastomer material of the elastomer body and/or vulcanization of the elastomer body may be carried out in a tool into which the inner sleeve, the outer sleeve and where applicable the intermediate sleeve are inserted and retained in their predetermined positions.

Under a tensile load, the elastomer material of the elastomer body reacts by "intertwined" polymer chains stretching out. The polymer chains are oriented in the direction of the load, and the elastomer material is stretched; however, this state is less favorable than the intertwined state in terms of energy. The polymer chains return to their preferred intertwined structure when the tensile stress is reduced or ceases, and the elastomer material contracts again. The intertwined polymer chains may also be compressed together again, similarly to a spiral spring, and the intertwining then becomes even denser. In principle, when loaded once in the tensile direction and compression direction, the elastomer material can equally be stretched or compressed to approximately half of the original state without the elastomer material tearing in the process. It is different for a permanent variable load, for example in motor bearings. By stretching the polymer chains, the bonds between the individual polymer strands can tear more rapidly than when the polymer chains are only compressed. The aim of a durable construction is therefore intended to be that of reducing the tensile stresses in the elastomer material and of limiting them to only compressive stresses.

The crosslinking density in the elastomer material has a major effect on the ductility of the elastomer body in this case. A high crosslinking density is reflected in lower ductility, and the elastomer body is more rigid. In reverse, this means that the lower the rigidity or Shore hardness of the elastomer body, the lower the maximum tensile strength. In order to obtain a durable construction, in addition to preventing tensile stresses, the aim is therefore intended to be that of using a relatively hard elastomer material. For electric vehicles, however, for example soft elastomer material having a Shore hardness of less than approximately 55° Sh-A, for example, of less than approximately 50° Sh-A, preferably less than approximately 45° Sh-A, may be used, due to oscillations in the audible range, for example the range audible to humans. The elastomer material may have a low tensile strength, for example less than or equal to approximately 40 MPa (corresponding to 40 N/mm$^2$), less than or equal to approximately 30 MPa (corresponding to 30 N/mm$^2$), preferably less than or equal to approximately 25 MPa (corresponding to 25 N/mm$^2$). A measurement method for measuring the tensile strength of elastomer material is defined in ISO 37, for example.

There is therefore a conflict between the aim of obtaining a durable construction of the bearing with elastomer material and the aim of effectively decoupling oscillations. In a motor bearing, for example, a "tensile-stress-free" construction is not possible. Specifically, the motor bearing not only has to support the motor, but also has to limit its movements. The latter often involves long distances, since this is required due to comfort features; for example, when accelerating or braking, the motor should not suddenly "slam" into the elastomer stops, but instead should contact them slowly. Moreover, soft elastomer material is intended to be used, since soft elastomer material results in greater isolation of the bearing. Neither of these things are indicative of a durable construction, and therefore other solutions need to be sought in order to obtain a durable construction.

Another point in relation to the elastomer material of the elastomer body is its hardening factor. Motor bearings not only have to support the motor and limit its movements, but also have to isolate and damp oscillations originating from the motor and/or transmission. If a component made of elastomer material is set into oscillation, it becomes increasingly hard as the frequency increases and the deformation speeds rise. The ratio of dynamic rigidity to static rigidity is referred to as the hardening factor. The hardening factor is dependent on the material, the component geometry and the load parameters. A measurement method for measuring the hardening factor is defined in ISO 4664 and VDA 675480. Generally, dynamic hardening is undesirable. As the rigidity increases, this results in a reduction in the isolation of oscillations, which may then become noticeable due to vibrations and/or noises. In order to meet all the requirements, an elastomer material is for example used in which, at a frequency of approximately 500 Hz, the hardening factor is between approximately 1.0 and approximately 1.2 or a loss angle is between approximately 2.5° and approximately 3°, or, at a frequency of over approximately 500 Hz, the hardening factor is less than approximately 1.2 or a loss angle is less than approximately 3°. This means that an elastomer material should be used that has a Shore hardness of less than approximately 55° Sh-A, for example, of less than approximately 50° Sh-A, preferably less than approximately 45° Sh-A, or silicones having corresponding properties should be used. A loss angle is referred to as an angle which indicates a phase shift between two vector quantities, one of which is unaffected and the other is affected by a medium, field and/or device. A measurement method for measuring the loss angle is defined in ISO 4664 and VDA 675480, for example.

For this reason, an elastomer material can be used which has a relatively low hardening factor of less than approximately 1.2, for example, or a loss angle of less than approximately 3°, for example, in order to increase the isolation of the motor bearings; however, a lower hardening factor or a lower loss angle also involves a decrease in the service life. A high hardening factor of greater than approximately 1.2, for example, or a high loss angle of greater than approximately 3°, for example, therefore means a long service life and a low hardening factor of less than approximately 1.2, for example, or a low loss angle of less than approximately 3°, for example, therefore means a short service life.

In order to resolve the above-described conflict between aims and/or to reduce manufacturing-related tensile stresses in the elastomer spring and/or to generate compressive preload in the elastomer spring and to increase the service life of the bearing, the bearing is typically calibrated, wherein the outer sleeve is compressed radially inwards, i.e. an external diameter of the outer sleeve is reduced. Owing to the calibration of the outer sleeve, the elastomer body is "preloaded", i.e. it is compressed, for example in the radial direction. If the elastomer body is then subjected to tensile stress, for example due to loading and movement from a motor supported by means of the elastomer body, the elastomer body effectively returns to its original position instead of being exposed to tensile stress. The elastomer body is therefore more durable. In addition, a relatively low hardening factor of the elastomer material can then be selected, with which the isolation of the bearing can be improved. The aim of the construction is therefore that the compressive stresses in the elastomer body outweigh the tensile stresses. In the elastomer body, the compressive stresses minus the tensile stresses are therefore greater than 0. As a result, elastomer material having a hardening factor of less than approximately 2.5, for example of less than approximately 1.8, preferably of less than approximately 1.2, or a loss angle of less than approximately 6°, for example of less than approximately 4.5°, preferably of less than approximately 3°, or silicones having low tear resistance, for example less than or equal to approximately 20 MPa (corresponding to 20 N/mm$^2$), for example less than or equal to approximately 15 MPa (corresponding to 15 N/mm$^2$), preferably less than or equal to approximately 10 MPa (corresponding to 10 N/mm$^2$), can be used. A measurement method for measuring the tear resistance is defined in ISO 37, for example.

When viewed in cross section, the deformation portion may be formed as a recess in the outer sleeve that is open radially outwards. In other words, when viewed in cross section, the deformation portion may be formed as a shaped portion of the outer sleeve that is directed inwards in the radial direction of the bearing. The deformation portion may comprise two multiple-curvature portions, described in greater detail in the following, which are formed to be opposite one another in the circumferential direction and are at a distance from one another in the circumferential direction, at least in the non-calibrated state. An axial extension of the deformation portion may preferably substantially correspond to an axial extension of the outer sleeve. In other words, the deformation portion may be formed along substantially the entire axial length of the outer sleeve and extend in the axial direction. The cross-sectional shape or cross-sectional contour of the deformation portion may be substantially constant along its axial extension or along the axial extension of the outer sleeve. On the outer sleeve, a plurality of deformation portions, for example two, four or six deformation portions, may be evenly distributed over the circumference of the outer sleeve, preferably in an axially symmetrical manner with respect to a diameter in cross section and/or so as to be point-symmetrical to the central longitudinal axis of the intermediate sleeve, wherein the deformation portions can preferably be oriented in a main stimulation direction. Free spaces may preferably be formed around the deformation portions, which are free of the elastomer body, wherein these free spaces can be formed simply by means of axial sliders in the injection mold or in the vulcanization mold.

The support-surface portion on the deformation portion may extend in a substantially planar manner in the axial direction and in the circumferential direction or tangential direction. In other words, the support-surface portion forms a substantially flat or curved surface in space which extends substantially in the axial direction and perpendicularly to the radial direction. As described above, an axial extension of the deformation portion and thus also an axial extension of the support-surface portion may preferably substantially correspond to an axial extension of the outer sleeve. Before and/or after calibration of the bearing, as described in greater detail in the following, an extension of the support-surface portion in the circumferential direction and/or in the tangential direction may be greater than the distance in the circumferential direction between the deformation portions in an outer circumferential region of the outer sleeve.

The bearing may be capable of calibration or preferably may be calibrated, wherein the deformation portion, which is formed to be open radially outwards, can also be formed to be open radially outwards after the calibration. In this case, the distance, such as the shortest distance, between the multiple-curvature portions in the circumferential direction may be shorter after the calibration than before the calibration, i.e. the distance when the outer sleeve has been calibrated may be shorter than the distance when the outer sleeve has not been calibrated. In other words, the multiple-curvature portions, which are at a distance from one another in the circumferential direction before the calibration, move closer together in the circumferential direction upon calibration. At the same time, the radial offset of the support-surface portion relative to the circumferential portion of the outer sleeve may become smaller upon calibration. In other words, the support-surface portion and the circumferential portion may move closer together in the radial direction upon calibration. Owing to the type of deformation of the deformation portion, local deformations in the elastomer body can be minimized.

After the calibration, the deformation portion may also be closed radially outwards, wherein the multiple-curvature portions formed to be opposite one another in the circumferential direction or each portion of the elastomer body attached to the multiple-curvature portions abut one another. This means that the distance when the outer sleeve has been calibrated may be approximately equal to zero, which, depending on the application, may be preferred compared with a distance of greater than zero.

Within the meaning of the present application, calibrating the bearing, such as the outer sleeve, means that, once the bearing has been produced, the outer sleeve is plastically deformed radially inwards in order to reduce production-related tensile stresses in the elastomer body, for example in its suspension-spring portions, and/or to generate compressive preload therein and to increase the service life of the bearing. In other words, during the calibration, the outer sleeve is compressed in the radial direction such that the outer sleeve has a smaller diameter after the calibration than before the calibration. A calibration tool is used for the calibration. For example, the bearing may be inserted into a multiple-jaw chuck and the multiple-jaw chuck may then be closed to a predetermined desired extent in a mechanically driven, for example hydraulically driven, manner, in order to preferably compress the outer sleeve, such as its circumferential portions, evenly radially inwards and to thus calibrate the bearing.

During the calibration of the bearing, such as the outer sleeve, in addition to the plastic deformation, elastic deformation of the outer sleeve may also occur, which can cause the deformation portion to "spring back" at least in part after the calibration. In other words, when the outer sleeve has been calibrated, the distance between the multiple-curvature portions in the circumferential direction may enlarge again somewhat after the calibration. The deformation portion "springing back" may occur in an outer sleeve made of at least partially resilient material, such as metal. In this case, a distance that remains larger due to this "springing back" when the outer sleeve has been calibrated can be prevented by what is known as "overcompression", wherein, during the calibration, the outer sleeve is compressed by an "excessive" amount, for example, by which the distance "springs back" again after the calibration. Alternatively or additionally, the distance when the outer sleeve has been calibrated can be prevented from "springing back" by means of a joining technique, for example by means of adhesively bonding and/or welding the end regions of the multiple-curvature portions which are opposite one another in the circumferential direction and between which the distance is measured. This approach may be taken with an outer sleeve made of plastics material, since "overcompression" is generally not possible in this case. For example, before the calibration a temperature-activated adhesive may be applied to the end regions, which is activated during or after the calibration. Alternatively or additionally, the end regions may be welded to one another, for example by means of ultrasonic welding in an outer sleeve made of plastics material. Preventing this "springing back" is advantageous when transporting the calibrated bearing and/or to facilitate assembly when mounting the calibrated bearing in a fastening sleeve.

In the bearing according to the disclosure, during the deformation upon calibration, which causes the diameter and thus also the circumference of the outer sleeve to be reduced, the reduction in circumference takes place substantially exclusively in the deformation portion or deformation portions. In other words, the deformation or displacement of the circumferential portion and the elastomer body molded thereon, such as its suspension-spring portion, is substantially exclusively radially inwards during the calibration. Therefore, on the circumferential portion of the outer sleeve, substantially no deformation or only slight deformation and thus substantially no shear forces or only slight shear forces arise between the outer sleeve and the elastomer body or the suspension-spring portion. Although the outer sleeve is therefore calibrated together with the elastomer body molded thereon, the risk of the elastomer becoming detached from the outer sleeve during calibration is thus minimized and reliable adhesion of the elastomer to the outer sleeve is ensured.

Advantageously, the outer sleeve of the bearing can be calibrated, wherein, during the calibration the support-surface portion is prevented from being displaced radially inwards by means of a counterholder, which abuts the support-surface portion.

In other words, the outer sleeve of the bearing can be calibrated such that, by means of a counterholder, which abuts the support-surface portion during the calibration, radially from the inside, a radial distance between the support-surface portion functioning as a stop and the midpoint of the outer sleeve, and thus also a space between the support-surface portion and the radially inwardly adjacent sleeve of the outer sleeve, is not reduced by the calibration. In addition, the support-surface portion can also be largely prevented from deforming during calibration by means of the counterholder. Furthermore, although, as described above, the circumferential portion is displaced radially inwards during the calibration, only a radial distance between the circumferential portion and the support-surface portion is reduced. Significant deformation of the circumferential portion does not occur in the above-described calibration.

The counterholder may be provided in the calibration tool, wherein the counterholder can be inserted into a space between the support-surface portion and the inner sleeve or intermediate sleeve in the axial direction. For example, the counterholder may comprise retaining fingers, wherein a number of the retaining fingers may correspond to the number of deformation portions. A retaining-surface portion may be formed on the retaining fingers, wherein an extension of the relevant retaining-surface portion in the circumferential direction and/or in the axial direction may correspond at least to the extension of the relevant support-surface portion in the circumferential direction and/or in the axial direction. The counterholder, such as its retaining finger, may preferably be designed to be stable such that the counterholder can withstand a force during the calibration. The outer radial contour of the counterholder may substantially correspond to the inner radial contour of the support-surface portion.

The above-described configuration is associated with the already above-mentioned advantage that the extent of the calibration is independent of the extent of the radial displaceability of the calibrated outer sleeve, i.e. the movement play of the calibrated outer sleeve, since the radial distance between the support-surface portion functioning as a stop and the midpoint of the outer sleeve is not reduced by the calibration. This means that this distance is the same size after the calibration as before the calibration. A high level of design freedom is thus also ensured when constructing the bearing.

Furthermore, in the above-described configuration it is advantageous that, compared with a conventional bearing, it is possible to calibrate the bearing according to the disclosure to a greater extent with less deformation of the elastomer body. This also contributes to the fact that the risk of the elastomer, which is injected, onto the outer sleeve, becoming detached during the calibration is minimized and thus ensures reliable adhesion of the elastomer to the calibrated outer sleeve. As a result, substantially complete overmolding of the not yet calibrated outer sleeve with elastomer, as is sought, can be achieved during the production of the bearing and the production of the bearing can thus be simplified.

The outer sleeve may be covered substantially completely by the elastomer body at least on a radial inner face.

The above-described configuration can also contribute to achieving substantially complete overmolding of the not yet calibrated outer sleeve with elastomer, as is sought, during the production of the bearing and thus to simplifying the production of the bearing. This is made possible by the above-described targeted radially inwardly directed deformation of the elastomer body, such as its suspension-spring portion, during the calibration.

Alternatively or additionally to the above-described configuration, a radial outer face of the outer sleeve may also be covered substantially completely by the elastomer body.

The substantially complete overmolding of the not yet calibrated outer sleeve with elastomer can thus be achieved during the production of the bearing and the production of the bearing can thus be simplified further.

When the bearing is pressed and/or adhesively bonded into the fastening sleeve, the outer sleeve can be free of the elastomer body on its radial outer face. Alternatively or additionally, when using an outer sleeve made of plastics material, the outer sleeve can also be free of the elastomer body on its radial outer face.

Therefore, the production of the not yet calibrated outer sleeve is simplified and can be achieved with greater accuracy, since the elastomer does not need to flow around the entire outer sleeve during production of the bearing and/or does not need to comply with a uniform thickness of the elastomer coating on the outer sleeve.

Axial end faces of the outer sleeve, the inner sleeve and/or the intermediate sleeve may be free of elastomer bodies or may also be covered with the elastomer body.

The support-surface portion, when viewed in cross section, may extend substantially in a circumferential direction that is offset radially inwards relative to the circumferential portion.

The support-surface portion, when viewed in cross section, may extend over an angular section of approximately 10° to approximately 45°.

In other words, the support-surface portion, when viewed in cross section, may extend in the circumferential direction and/or in the tangential direction over the arc length of an angle of approximately 10° to approximately 45°. The angular section or arc length stated here may relate to the calibrated state or the uncalibrated state of the bearing.

The above-described configuration ensures that the support surface is reliably supported on the counterholder during the calibration. In addition, this makes it possible for the support-surface portion, which also functions as a stop, to abut the radially inwardly adjacent sleeve of the outer sleeve or the counterholder of the calibration tool in a secure manner and so as to prevent any force peaks.

The deformation portion may also comprise a pair of multiple-curvature portions, which each at least comprise a first curvature portion, an inflection-point portion and a second curvature portion that is opposite the first curvature portion and is curved in the opposite direction, wherein the first curvature portion connects the circumferential portion to the inflection-point portion and the second curvature portion connects the inflection-point portion to the support-surface portion.

The inflection-point portion is a region of the multiple-curvature portion in which a change of sign of the curvature of the curvature portions takes place, so to speak. For example, the first curvature portion has a right-hand curvature before the inflection-point portion and the second curvature portion has a left-hand curvature after the inflection-point portion.

The first and/or the second curvature portion, when viewed in cross section, has a curvature angle of over approximately 90°, for example approximately 95° to approximately 175° or approximately 110° to approximately 160°. The curvature angle stated here may relate to the calibrated state or the uncalibrated state of the bearing.

The curvature angle of the first curvature portion may be substantially the same as the curvature angle of the second curvature portion. Alternatively, the first and the second curvature portion may have different curvature angles from one another.

The inflection-point portion may be substantially straight or also substantially punctiform in cross section.

In addition to the first curvature portion, the inflection-point portion and the second curvature portion, the relevant multiple-curvature portion may additionally comprise further curvature portions and further inflection-point portions. The multiple-curvature portion may, however, only comprise the first curvature portion, the inflection-point portion and the second curvature portion, wherein the multiple-curvature portion can also be referred to as a double-curvature portion in this case. The double-curvature portion may be substantially S-shaped or S-shaped in a mirror-inverted manner in cross section.

With the above-described configuration, the calibration of the bearing according to the disclosure can be further promoted to a greater extent and deformation of the elastomer body, also of the circumferential portion and the support-surface portion, can also be kept low and/or largely prevented during the calibration.

The first curvature portion and the second curvature portion may preferably be formed to have a greater wall thickness than the inflection-point portion and/or the support-surface portion.

The wall thickness of the relevant curvature portion may become gradually thicker and then thinner. In other words, the relevant curvature portion may progress from a thicker to a thinner wall thickness and vice versa, i.e. the wall thickness of the relevant curvature portion is not stepped.

For example, in the thickest region the wall thickness of the relevant curvature portion may be approximately 30% to approximately 1000% thicker or approximately 200% to approximately 800% thicker than the thinnest region of the inflection-point portion and/or the support-surface portion. With an outer sleeve made of metal, for example aluminum, in the thinnest region of the inflection-point portion and/or the support-surface portion the wall thickness may be approximately 0.5 mm and in the thickest region the wall thickness of the relevant curvature portion may be approximately 2 mm. With an outer sleeve made of plastics material, in the thinnest region of the inflection-point portion and/or the support-surface portion the wall thickness may be approximately 0.5 mm and in the thickest region the wall thickness of the relevant curvature portion may be approximately 5 mm.

The above-described configuration can further promote the targeted deformability during the calibration.

A distance between the multiple-curvature portions when the outer sleeve has been calibrated may be smaller than a distance between the multiple-curvature portions when the outer sleeve has not been calibrated.

When the outer sleeve has been calibrated, a distance between the multiple-curvature portions that increases again after calibration due to the deformation portion resiliently springing back is prevented by end regions of the multiple-curvature portions that are opposite one another in the circumferential direction being connected by adhesive bonding and/or welding when the outer sleeve has been calibrated.

The above-described bearing may also comprise an intermediate sleeve, wherein the intermediate sleeve is preferably designed as a damping mass.

The elastomer body may comprise at least one pair of outer suspension springs, which resiliently interconnects the intermediate sleeve and the outer sleeve, and at least one pair of inner suspension springs, which resiliently interconnects the intermediate sleeve and the inner sleeve.

The pair of outer suspension springs and the pair of inner suspension springs may preferably be arranged in a row in the radial direction. In other words, when viewed in the radial direction, an inner suspension spring and an outer suspension spring are arranged one behind the other.

With the above-described configuration, the bearing together with the damping mass forms what is known as a damping bearing, for decoupling a component to be supported from oscillations in different frequency ranges, which are for example generated by an internal combustion engine and/or an electric motor during operation of a motor vehicle. Advantageously, the damping bearing can be accurately and finely adjusted to the damping of the different frequency ranges by means of the extent of the calibration and/or dimensioning of the respective suspension springs.

In the above-described multiple-part intermediate sleeve, the individual intermediate sleeve parts may preferably each be arranged between the outer suspension spring and the inner suspension spring, which, when viewed in the radial direction, is therefore arranged in a row. In other words, the gap by means of which the individual intermediate sleeve parts are arranged so as to be separated from one another in the circumferential direction may preferably be arranged to be in a row with the deformation portion in the radial direction. The number of gaps may preferably be equal to the number of deformation portions. For example, with two deformation portions, the two intermediate sleeve parts may be designed as half shells.

The individual intermediate sleeve parts may each have a differing mass, which means that the suspension springs arranged one behind the other in the radial direction can be assigned their own frequency. It is clear that at least two intermediate sleeve parts may have the same mass.

When viewed in cross section, the intermediate sleeve parts may preferably be designed to be arc-like, but alternatively may also be straight.

During the calibration of the bearing, in which, as described above, the outer suspension spring may be preloaded by radially compressing the outer sleeve, the intermediate sleeve may also advantageously be calibrated or displaced radially inwards by means of the multiple-part intermediate sleeve and the inner suspension spring may thus also be preloaded. A greater degree of calibration of the bearing can thus take place.

The extent of the calibration of the multiple-part intermediate sleeve, such as the extent of the radial compression of the multiple-part intermediate sleeve, can be controlled by means of a width of the gap, measured in the circumferential direction, between the intermediate sleeve parts. The width of the gap may preferably be smaller than or the same size as the distance between the multiple-curvature portions in the circumferential direction when the outer sleeve has not been calibrated. For example, the width of the gap may preferably be approximately half as large as through to approximately the same size as the distance between the multiple-curvature portions in the circumferential direction when the outer sleeve has not been calibrated.

With the above-described configuration, the calibration of the bearing can be more finely adjusted and/or, depending on the application, can be carried out so as to be distributed between the outer suspension spring and the inner suspension spring in almost any way.

Decoupling or absorbing oscillations in two different frequency ranges can be referred to as "double isolation". A bearing having a double-isolation function is advantageous in motor vehicles having hybrid drive technology, in order to be able to decouple or absorb both oscillations from an internal combustion engine, a transmission and/or a chassis component and oscillations from an electric drive.

The intermediate sleeve designed as a damping mass may have approximately 10% to approximately 1000% or approximately 200% to approximately 800%, preferably approximately 300% to approximately 500%, more mass than the outer sleeve or the inner sleeve. The intermediate sleeve designed as a damping mass and made of metal, for example of steel, may have a mass of approximately 250 g and the outer sleeve made of plastics material may have a mass of approximately 50 g. The intermediate sleeve designed as a damping mass and made of metal, for example of steel, may have a mass of approximately 250 g and the outer sleeve, which is for example likewise made of metal, for example of steel, may have a mass of approximately 100 g.

With the above-described configuration, in which the intermediate sleeve acts as a damping mass or oscillation damper, the decoupling characteristics or damping characteristics of the bearing can be adjusted in a yet further improved manner in a wide frequency range.

The suspension-spring portions may be arranged so as to be distributed evenly in the circumferential direction, so as to be opposite one another in pairs. The bearing may for example comprise eight suspension-spring portions, i.e. two pairs of outer suspension springs and two pairs of inner suspension springs. An angle between the respective suspension-spring portions may be approximately 90° when viewed in the axial direction. The suspension-spring portions may be formed in one piece with one another.

The spring rates of the inner suspension springs and the outer suspension springs may be adjusted to be the same. Furthermore, the relevant spring rate of the inner suspension springs and the outer suspension springs may be adjusted to be as high as possible.

The inner sleeve may comprise at least one inner-sleeve stop, which projects radially outwards and limits a relative radial displacement of the inner sleeve and/or the intermediate sleeve.

Preferably, the deformation portion, such as the support-surface portion, and the inner-sleeve stop may be arranged in a row in the radial direction.

With the above-described configuration, a relative radial movement of the intermediate sleeve and/or the inner sleeve can be limited in a simple manner and the service life of the bearing can thus be increased.

Advantageously, a plurality of inner-sleeve stops, for example two or four inner-sleeve stops, may be formed on the inner sleeve.

When viewed in cross section, the relevant inner-sleeve stop may be substantially rectangular or square and may comprise a stop-surface portion formed to be perpendicular to the radial direction. The stop-surface portion may extend in a planar manner in the axial direction and in the circumferential direction or tangential direction. An axial extension of the stop-surface portion and thus also an axial extension of the inner-sleeve stop may preferably substantially correspond to an axial extension of the inner sleeve.

The inner-sleeve stops and the above-described support-surface portions may be arranged so as to be distributed evenly in the circumferential direction, so as to be opposite one another in pairs. The bearing may for example comprise eight stops, i.e. two pairs of inner-sleeve stops and two pairs of support-surface portions. An angle between the respective stops may be approximately 90° when viewed in the axial direction.

A free space that is free of the elastomer body may preferably be formed around each inner-sleeve stop in order not to impair the displacement of the inner sleeve until it contacts the inner-sleeve stop.

Another aspect relates to an outer sleeve for a bearing, for example for the above-described bearing, wherein the outer sleeve comprises a circumferential portion and at least one deformation portion that is recessed radially inwards from the circumferential portion, and wherein the deformation portion comprises a support-surface portion arranged so as to be offset radially inwards relative to the circumferential portion of the outer sleeve, wherein the support-surface portion extends substantially perpendicularly to the radial direction.

The deformation portion may comprise two multiple-curvature portions, which are formed to be opposite one another in the circumferential direction and are at a distance from one another in the circumferential direction.

Another aspect relates to a method for producing a bearing, comprising:
providing an inner sleeve,
providing an outer sleeve, wherein the outer sleeve comprises a circumferential portion and at least one deformation portion that is recessed radially inwards from the circumferential portion, wherein the deformation portion comprises a support-surface portion arranged so as to be offset radially inwards relative to the circumferential portion of the outer sleeve, and wherein the support-surface portion extends substantially perpendicularly to the radial direction,
providing an elastomer body, which resiliently interconnects the inner sleeve and the outer sleeve,
inserting a counterholder between the outer sleeve and the inner sleeve such that the counterholder abuts the support-surface portion, radially from the inside, and
calibrating the outer sleeve, wherein, by means of the counterholder, the support-surface portion is prevented from being displaced radially inwards.

The advantages and configurations described above in relation to the bearing are also applicable to the method for producing the above-described bearing.

In order to provide the elastomer body, the individual parts of the bearing, such as the inner sleeve and the outer sleeve, and where applicable also the intermediate sleeve, can preferably be inserted into a tool in which the individual parts are retained in their predetermined positions. The individual parts can then be overmolded with elastomer at least in part.

The inner sleeve, the outer sleeve, and where applicable the intermediate sleeve can be completely overmolded with the elastomer body, wherein the inner sleeve can also be free of the elastomer body on its radial inner face. Alternatively or additionally, the outer sleeve can be free of the elastomer body on its radial outer face.

After calibrating the bearing, such as its outer sleeve, the method for producing the bearing may also comprise pressing and/or adhesively bonding the bearing into a fastening sleeve.

The fastening sleeve may form an outer connection of the bearing, which can be indirectly or directly connected to a component, such as a motor, or to a vehicle frame, on which another component is intended to be supported in a substantially oscillation-decoupled manner.

Embodiments of the bearing according to the disclosure are described in the following on the basis of drawings. It is clear that the disclosure is not limited to the embodiments described below, and that individual features of the embodiments can be combined to form other embodiments.

DESCRIPTION OF EMBODIMENTS

Figure 1:
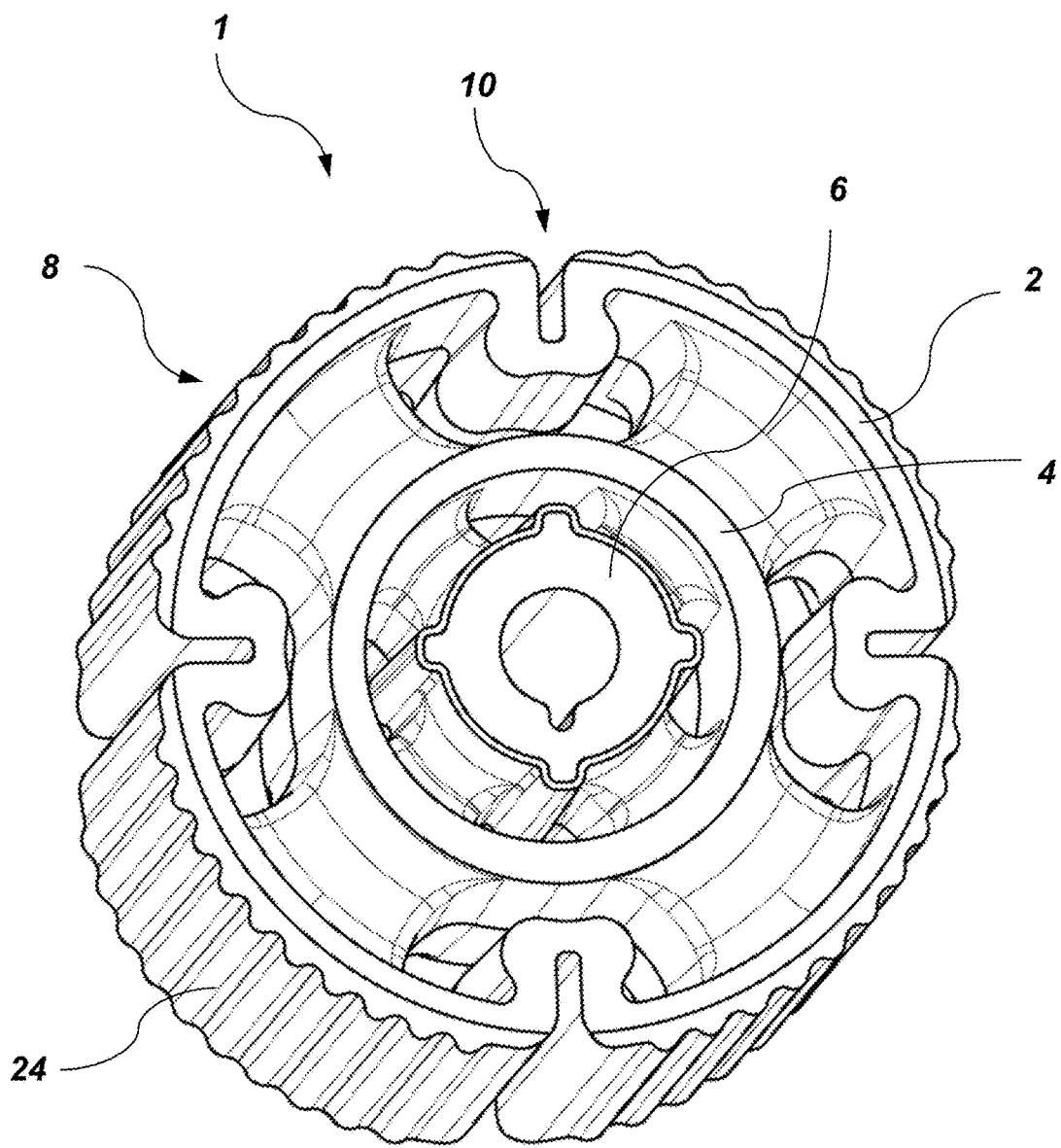
FIG. 1 is a three-dimensional view of a bearing according to the disclosure in the uncalibrated state.
Figure 1:
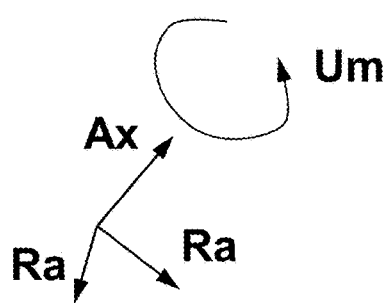

An axial direction Ax, a circumferential direction Um, a tangential direction Ta and two exemplary radial directions Ta are shown in the drawings by means of directional arrows, in the manner of a coordinate system. Although the directional arrows only point in one direction, the indication of the direction also includes the opposite direction in each case. By way of example, two radial directions Ra are indicated in order to give an impression of the many possible radial directions Ra.

With reference to FIGS. 1 to 6, embodiments of a bearing 1 are described in the following.

Figure 2:
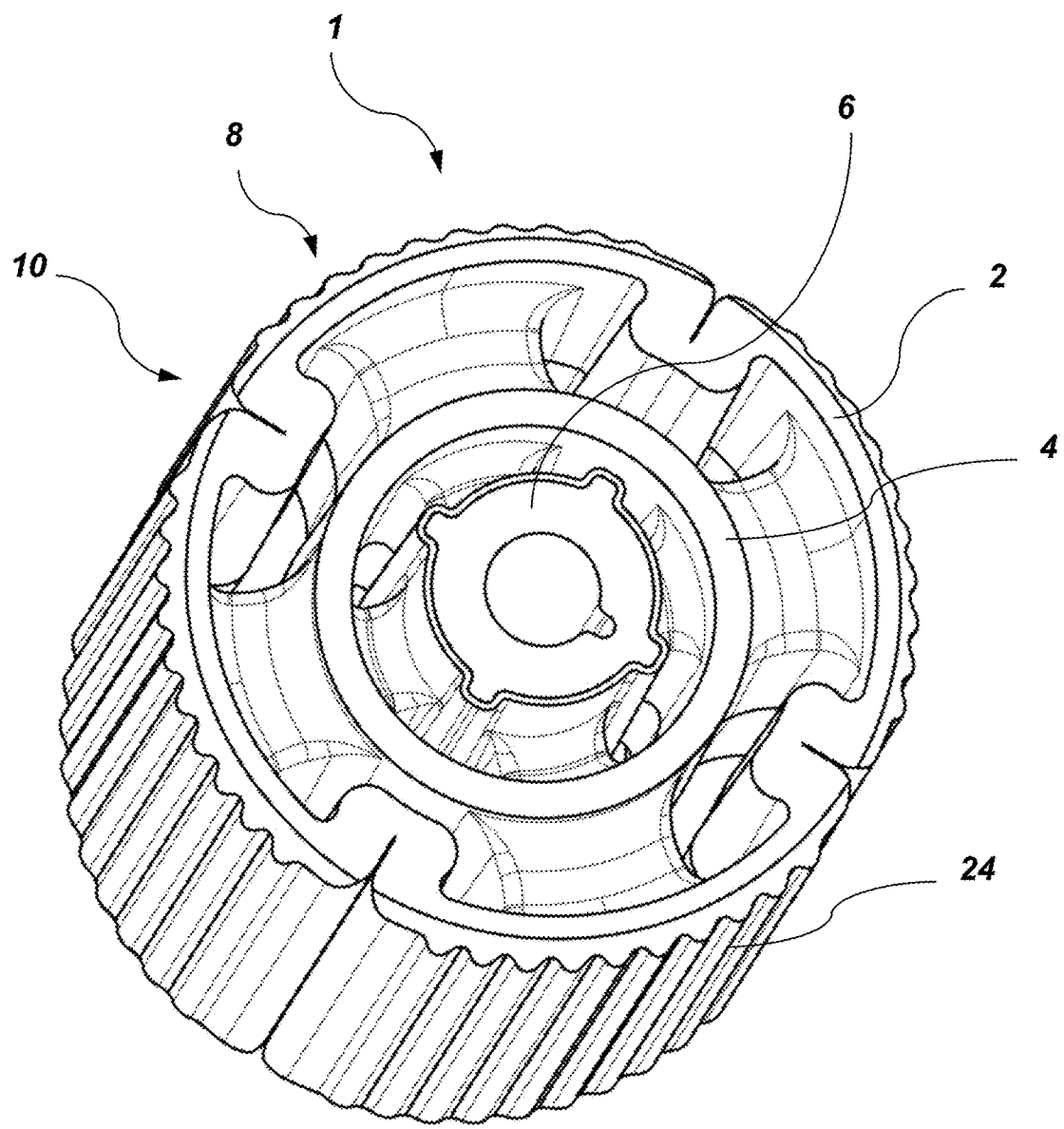
FIG. 2 shows the bearing according to FIG. 1 in the calibrated state.
Figure 2:
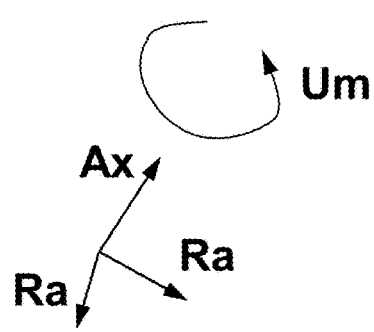

The bearing 1 may comprise an outer sleeve 2, an intermediate sleeve 4 and an inner sleeve 6. As shown in FIGS. 1 and 2, the respective extensions of the outer sleeve 2 and the inner sleeve 6 in the axial direction Ax are substantially the same, whereas the extension of the intermediate sleeve 4 in the axial direction Ax may be shorter in order to allow the intermediate sleeve 4 to oscillate without any disruption. In the embodiment of the bearing 1 shown in FIGS. 1 to 4, the inner sleeve 6, the outer sleeve 2 and/or the intermediate sleeve 4 may be formed as closed sleeves that are circumferential in cross section. Alternatively, in the embodiment of the bearing 1 shown in FIGS. 5 and 6, the intermediate sleeve 4 may be formed in multiple parts and so as to be interrupted in the circumferential direction Um. A gap 9 which separates the intermediate sleeve parts 7 from one another may be arranged between each set of two intermediate sleeve parts 7 of the intermediate sleeve 4 in the circumferential direction.

As also shown in FIGS. 1 to 6, the outer sleeve 2 may comprise four circumferential portions 8, which can be connected by means of four deformation portions 10. In this case, the circumferential portions 8 and the deformation portions 10 may each be opposite one another in pairs and may be arranged so as to be distributed evenly in the circumferential direction Um such that an angle between the midpoints of the respective adjacent circumferential portions 8 and the respective deformation portions 10 may be approximately 90° when viewed in the axial direction Ax. The outer sleeve 2 may be formed in one piece, as shown.

The deformation portion 10 comprises a support-surface portion 12 arranged so as to be offset radially inwards relative to the circumferential portion 8 of the outer sleeve 2, wherein the support-surface portion 12 extends substantially perpendicularly to the radial direction Ra. An axial extension of the deformation portion 10 may substantially correspond to an axial extension of the outer sleeve 2.

The support-surface portion 12 may function as a stop, wherein the support-surface portion 12, when the bearing 1 is not loaded, may have a predetermined radial distance 16 radially inwards from the midpoint 18 of the outer sleeve, and thus a predetermined space from the radially inwardly adjacent intermediate sleeve 4.

According to the embodiments of the bearing 1, when viewed in cross section, the deformation portion 10 may be formed as a recess in the outer sleeve 2 that is open radially outwards, wherein the deformation portion 10 may comprise two multiple-curvature portions 14, which can be formed to be opposite one another in the circumferential direction Um and have a distance 20, 22 from one another in the circumferential direction Um.

As shown in the embodiments of the bearing 1, the support-surface portion 12 may extend in a planar manner in the axial direction Ax and in the circumferential direction Um or tangential direction Ta. According to the axial extension of the deformation portion 10, an axial extension of the support-surface portion 12 may also substantially correspond to the axial extension of the outer sleeve 2.

Figure 3:
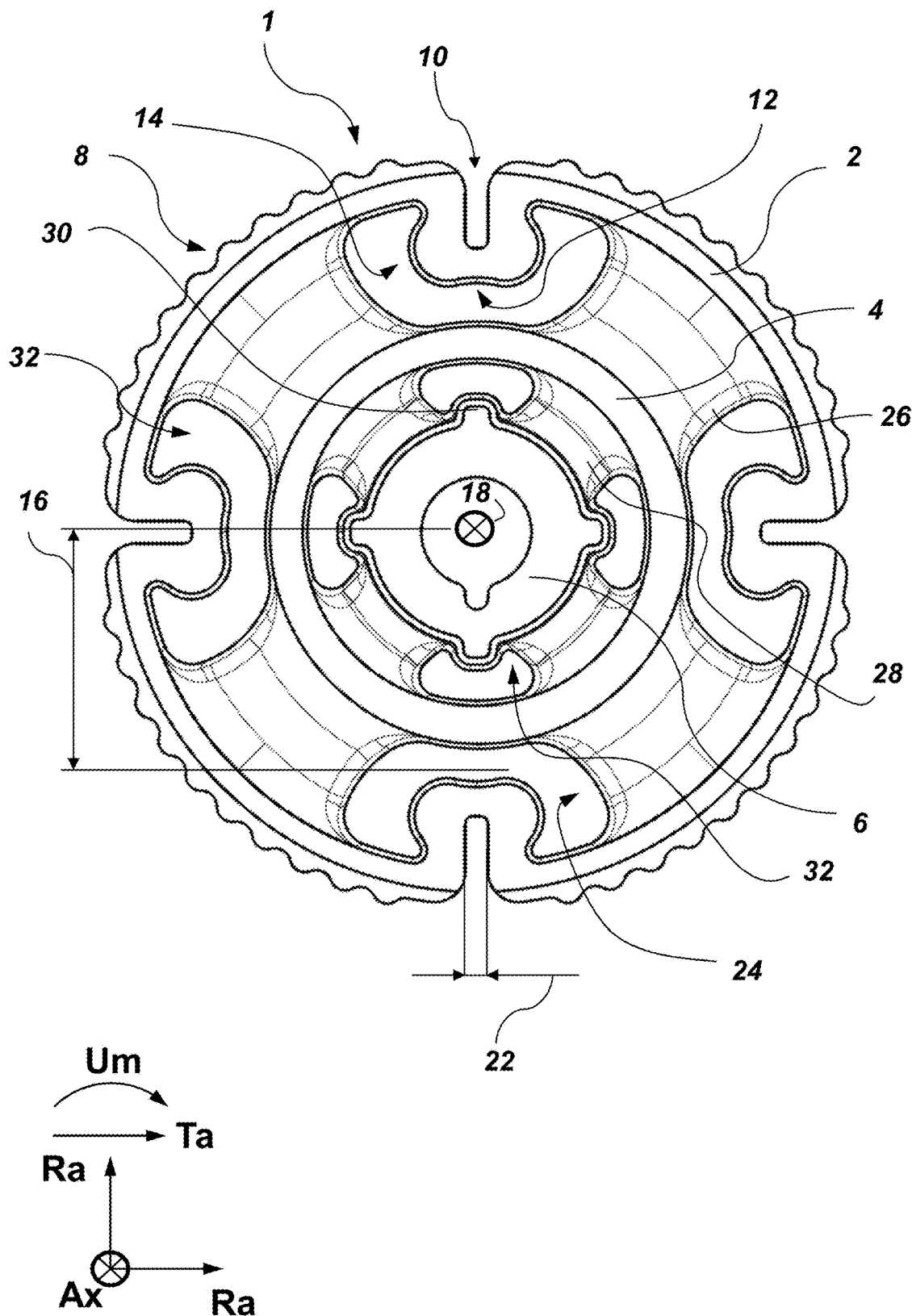
FIG. 3 is a plan view of the bearing according to FIG. 1.
Figure 4:
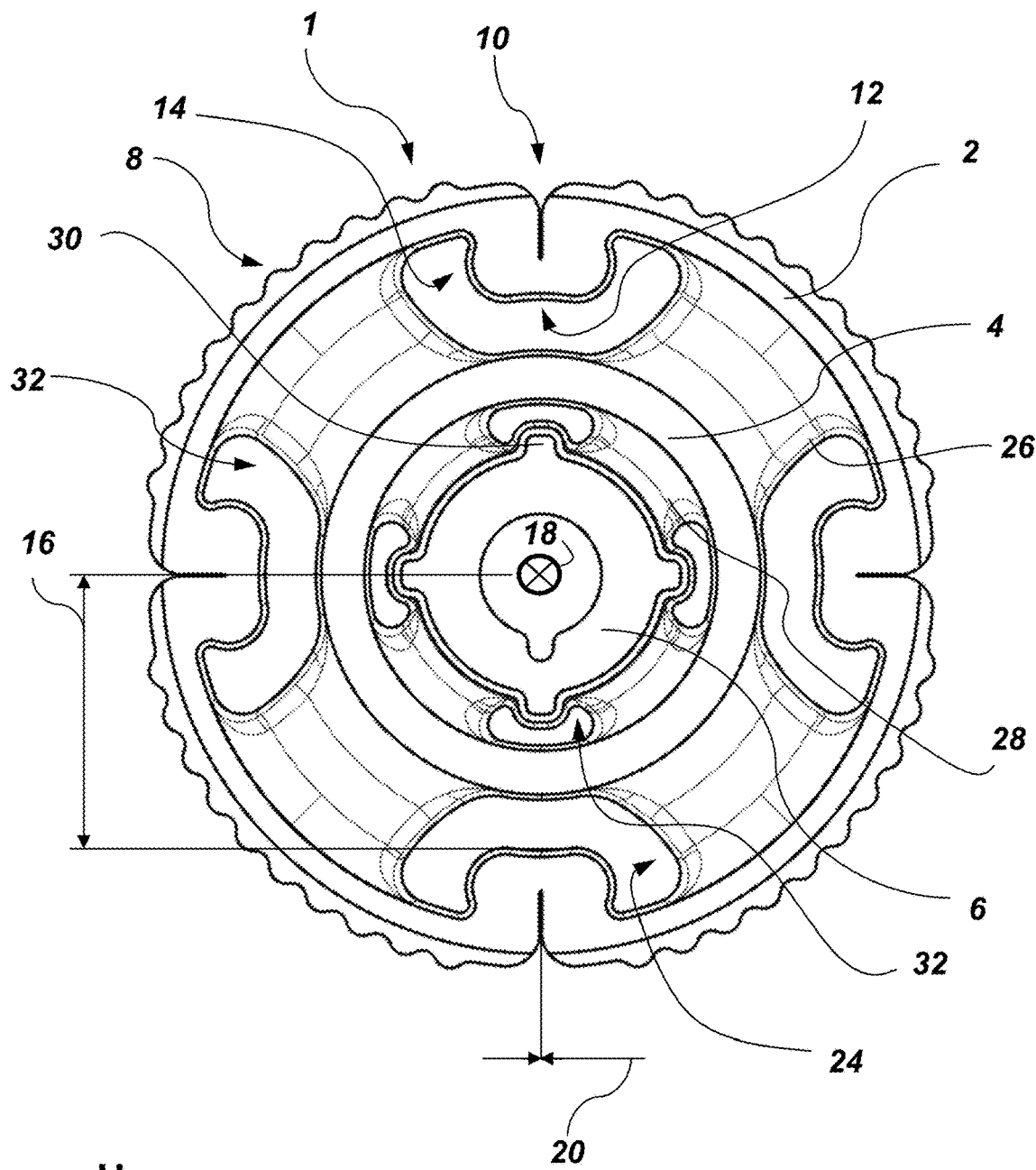
FIG. 4 is a plan view of the bearing according to FIG. 2.
Figure 4:
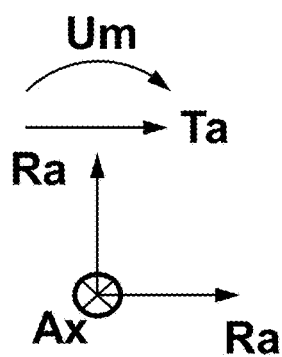
Figure 5:
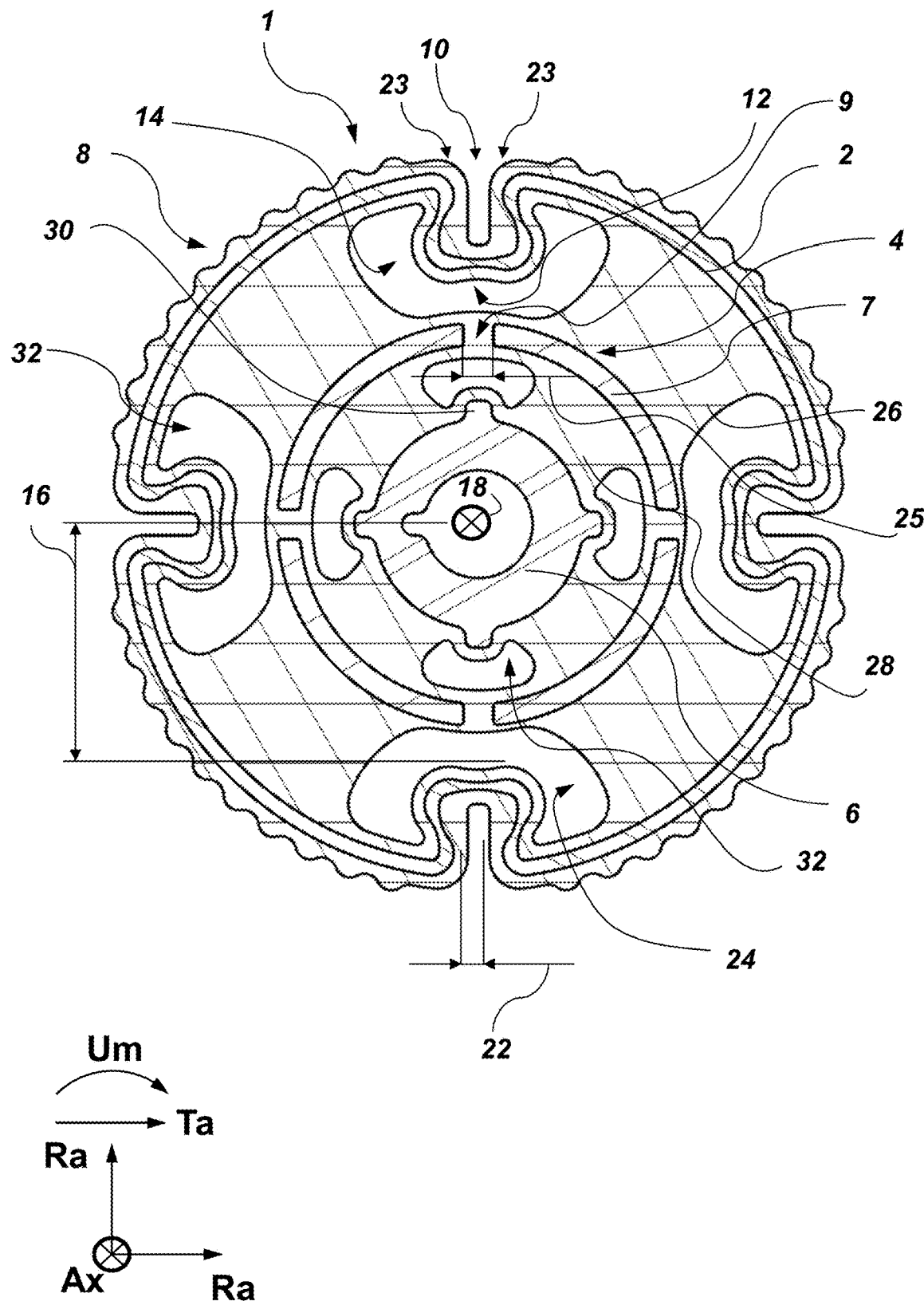
FIG. 5 is a cross section of the bearing according to FIG. 1 comprising a multiple-part intermediate sleeve.
Figure 6:
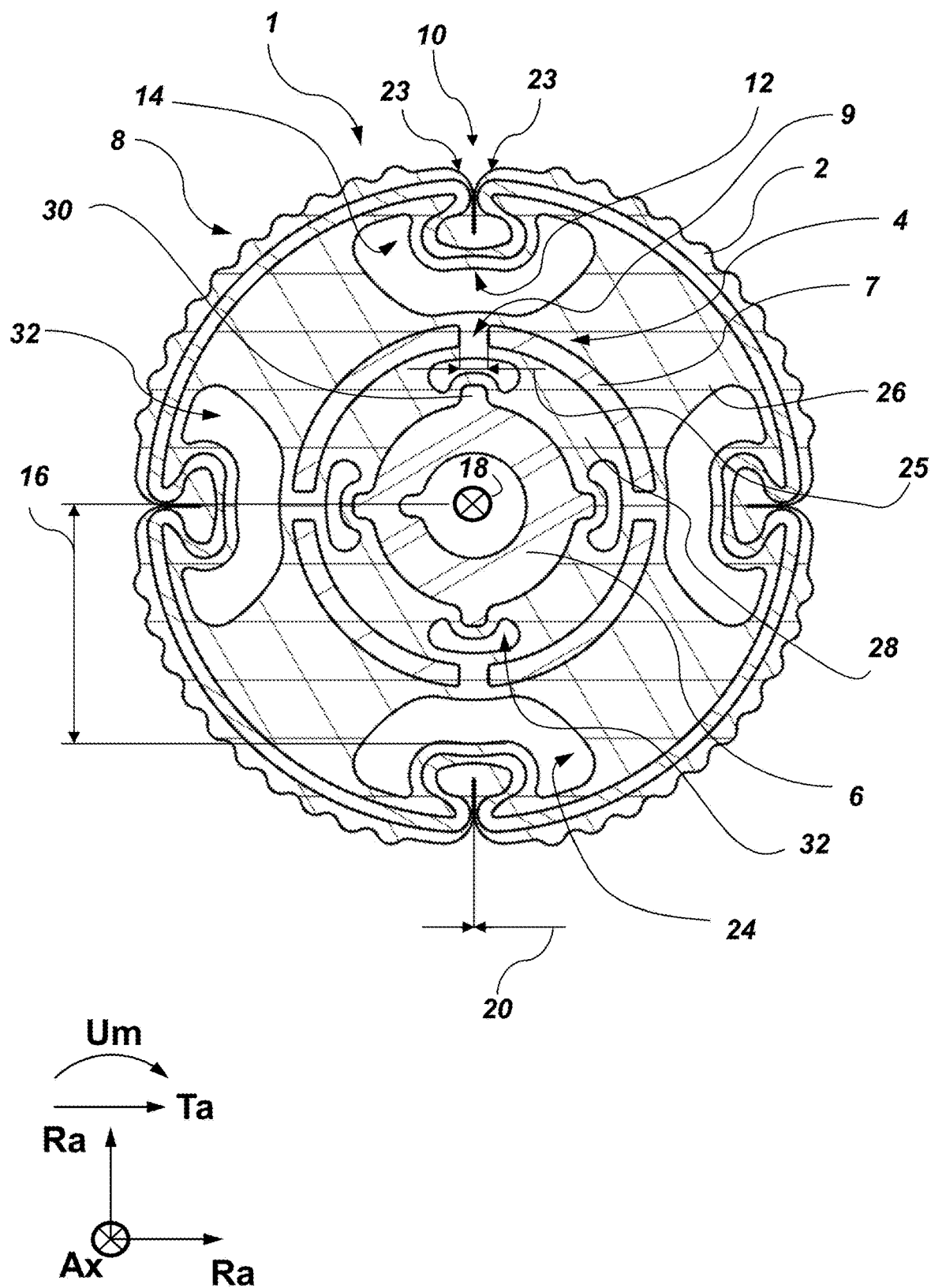
FIG. 6 is a cross section of the bearing according to FIG. 2 comprising a multiple-part intermediate sleeve.

For the bearing 1 shown in FIGS. 2, 4 and 6 in the calibrated state, the distance 20 between the multiple-curvature portions 14 is significantly shorter than the distance 22 for the bearing 1 shown in FIGS. 1, 3 and 5 in the uncalibrated state, wherein the multiple-curvature portions 14 formed to be opposite one another in the circumferential direction Um or each portion of the elastomer body 24 attached to the multiple-curvature portions 14 can also abut one another after the calibration, as shown in FIG. 6, in which the distance 20 between the deformation portions 10, at least those having their elastomer coating, is approximately equal to zero.

During the calibration of the bearing 1, such as the outer sleeve 2, in addition to the plastic deformation, elastic deformation of the outer sleeve 2 may also occur, which can cause the deformation portion 10 to "spring back" at least in part after the calibration, i.e. can cause the distance 20 between the multiple-curvature portions 14 to enlarge when the outer sleeve 2 has been calibrated after the calibration.

In order to prevent the deformation portion 10 from "springing back", i.e. to also maintain the distance 20 between the deformation portions 10, which, as shown in FIG. 6, is approximately equal to zero, for example, after the calibration, various measures can be taken depending on the material of the outer sleeve 2:

The deformation portion 10 "springing back" may be prevented in an outer sleeve 2 made of at least partially resilient material, such as metal, by what is known as "overcompression". In this case, during the calibration, the outer sleeve 2 is compressed by an "excessive" amount, for example, by which the distance 20 "springs back" again after the calibration.

Alternatively or additionally, the distance 20 when the outer sleeve 2 has been calibrated can be prevented from "springing back" by means of adhesively bonding and/or welding the end regions 62 of the multiple-curvature portions 14 which are opposite one another in the circumferential direction Um. For example, before the calibration a temperature-activated adhesive may be applied to the end regions 62, which is activated during or after the calibration. Alternatively or additionally, the end regions 62 may be welded to one another, for example by means of ultrasonic welding with an outer sleeve 2 made of plastics material.

Furthermore, with reference to FIGS. 5 and 6, the effects of the calibration on the multiple-part intermediate sleeve 4 and the gaps 9 between their intermediate sleeve parts 7 and the differences between the uncalibrated multiple-part intermediate sleeve 4 and their gaps 9 and the calibrated multiple-part intermediate sleeve 4 and their gaps 9 are described in the following.

During the calibration, the multiple-part intermediate sleeve 4 can also be radially compressed and the inner suspension spring 28 can thus also be preloaded. In this case, the extent of the radial compression of the multiple-part intermediate sleeve 4 can be controlled by means of a width 58 of the gap 9, measured in the circumferential direction Um, between the intermediate sleeve parts 7.

The width 25 of the gap 9 when the intermediate sleeve 4 has been calibrated is smaller than the width 25 of the gap 9 when the intermediate sleeve 4 has not been calibrated.

As also shown, an extension of the support-surface portion 12 in the circumferential direction Um and/or in the tangential direction Ta before and after the calibration of the bearing 1 may be greater than the distance 20, 22 in the circumferential direction Um between the deformation portions 10, such as the first curvature portions 44 thereof described below.

According to the embodiments of the bearing 1, the outer sleeve 2 and the intermediate sleeve 4 may each be covered with an elastomer body 24 on their radial outer face and their radial inner face, wherein the inner sleeve 6 may be covered with an elastomer body 24 on its radial outer face and may be free of the elastomer body 24 on its radial inner face.

By means of the elastomer body 24, the outer sleeve 2 and the intermediate sleeve 4 may be resiliently interconnected, for example by means of suspension-spring portions of the elastomer body 24 formed as outer suspension springs 26. Furthermore, by means of the elastomer body 24, the intermediate sleeve 4 and the inner sleeve 6 may be resiliently interconnected, for example by means of suspension-spring portions of the elastomer body 24 formed as inner suspension springs 28.

As shown, the elastomer body 24 may comprise two pairs of outer suspension springs 26 and two pairs of inner suspension springs 28. In this case, the outer suspension springs 26 and the inner suspension springs 28 may each be opposite one another in pairs and may be arranged so as to be distributed evenly in the circumferential direction Um such that an angle between the midpoints of the respective adjacent outer suspension springs 26 and the respective inner suspension springs 28 may be approximately 90° when viewed in the axial direction Ax. The pairs of outer suspension springs 26 and the pairs of inner suspension springs 28 may each be arranged in a row in the radial direction Ra.

According to the embodiments of the bearing 1 shown, the inner sleeve 6 may comprise four inner-sleeve stops 30, which each project radially outwards and limit a relative radial displacement of the inner sleeve 6 and/or the intermediate sleeve 4.

The inner-sleeve stops 30 and the deformation portions 10, such as their support-surface portions 12, may be arranged opposite one another in pairs and so as to be distributed evenly in the circumferential direction Um. According to the embodiments, the bearing 1 may comprise eight stops 12, 30, i.e. two pairs of inner-sleeve stops 30 and two pairs of support-surface portions 12, wherein one pair of support-surface portions 12 and one pair of inner-sleeve stops 30 can be arranged in a row when viewed in the radial direction Ra. An angle between the midpoints of the respective adjacent stops 12, 30 may be approximately 90° when viewed in the axial direction Ax.

As shown, free spaces 32 may be formed around the stops 12, 30, for example around the deformation portions 10 and the inner-sleeve stops 30, which are free of the elastomer body.

With reference to FIGS. 7 to 11, the effects of the calibration on the outer sleeve 2 and its deformation portions 10 and the differences between the uncalibrated outer sleeve 2 and its deformation portions 10 and the calibrated outer sleeve 2 and its deformation portions 10 are described in the following according to the embodiments of the bearing 1.

Figure 7:
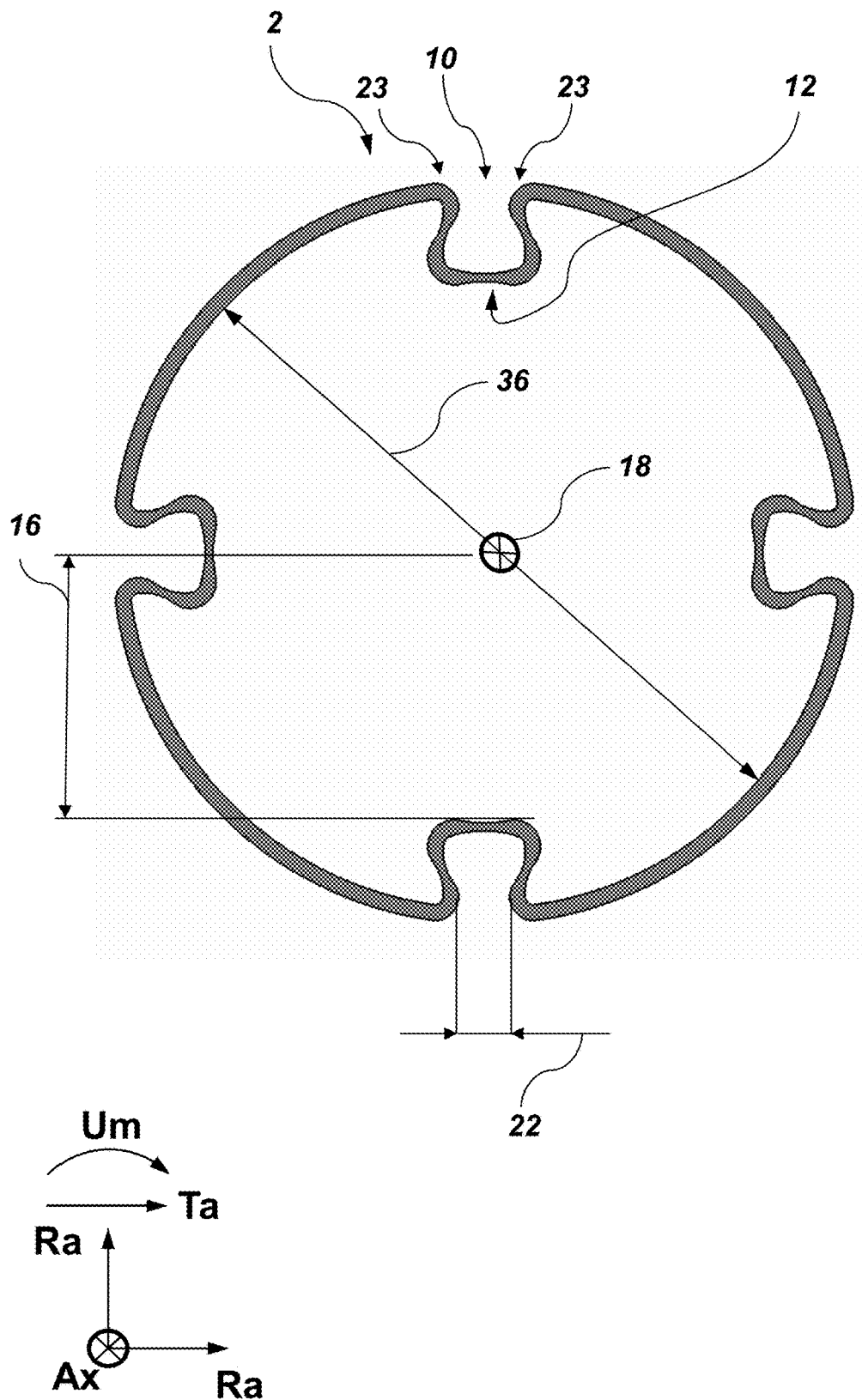
FIG. 7 is a plan view of an outer sleeve of the bearing according to FIG. 1.
Figure 8:
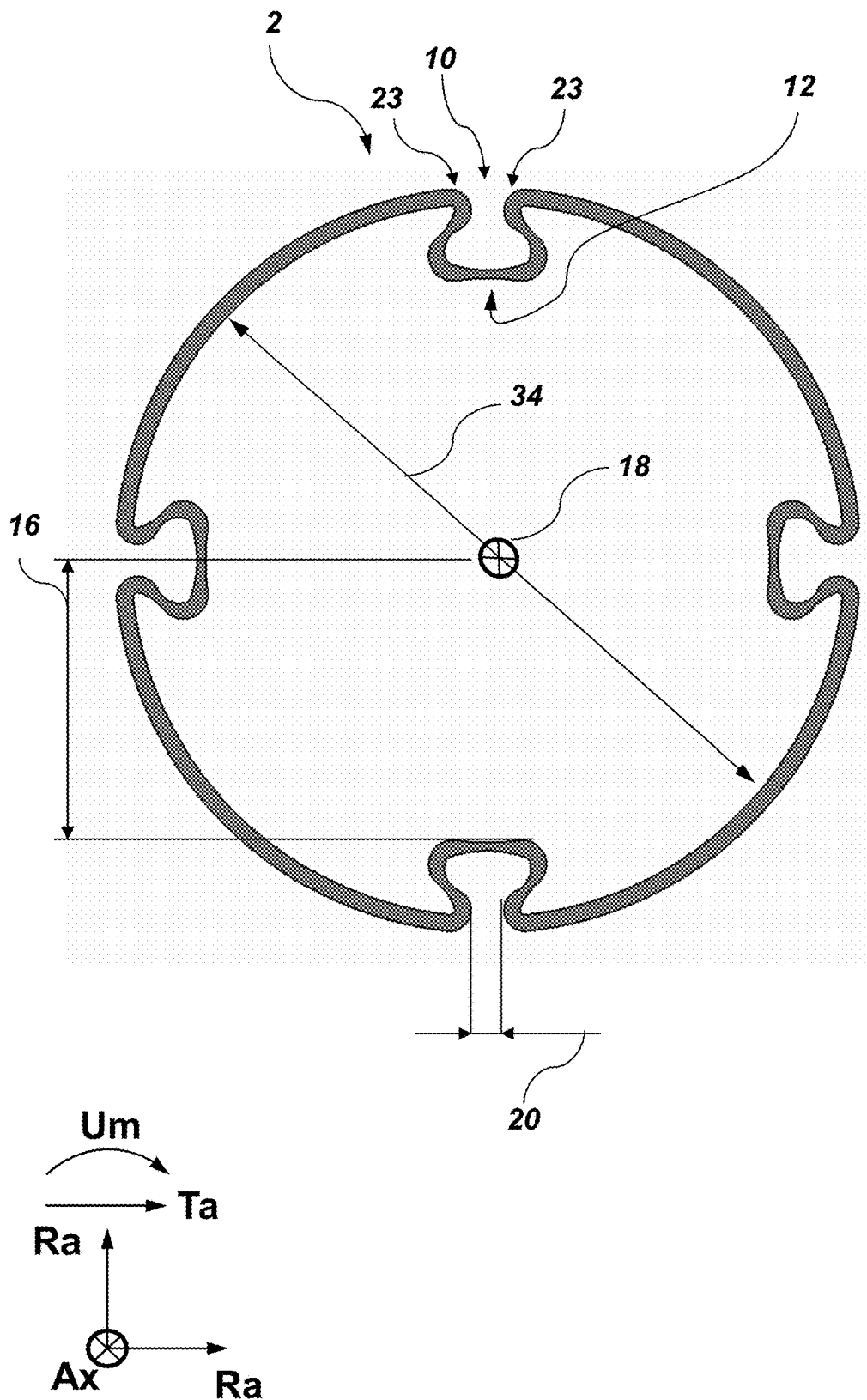
FIG. 8 is a plan view of an outer sleeve of the bearing according to FIG. 2.
Figure 9:
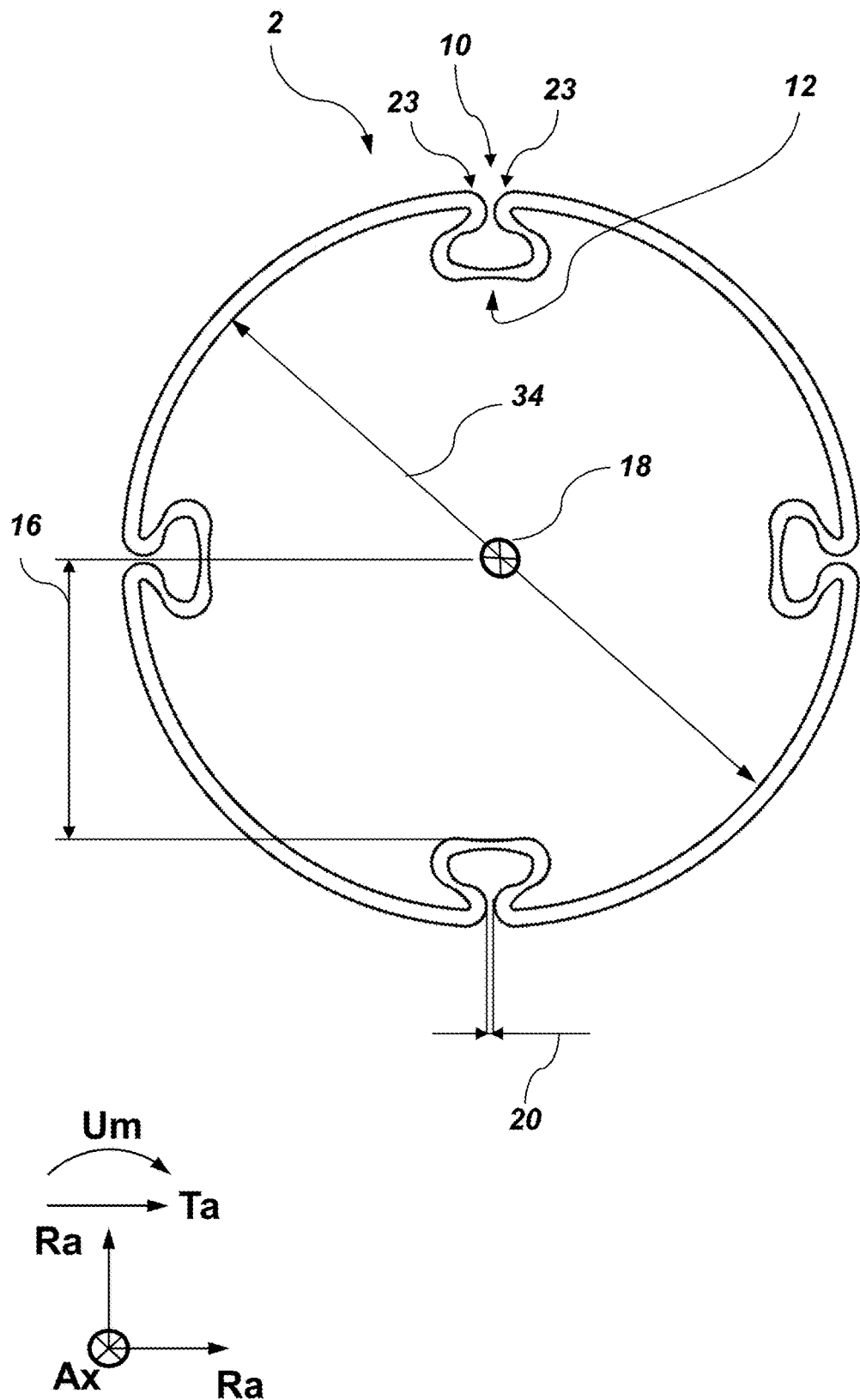
FIG. 9 is a plan view of an outer sleeve of the bearing according to FIG. 2 with a distance between the deformation portions approximately equal to zero.
Figure 10:
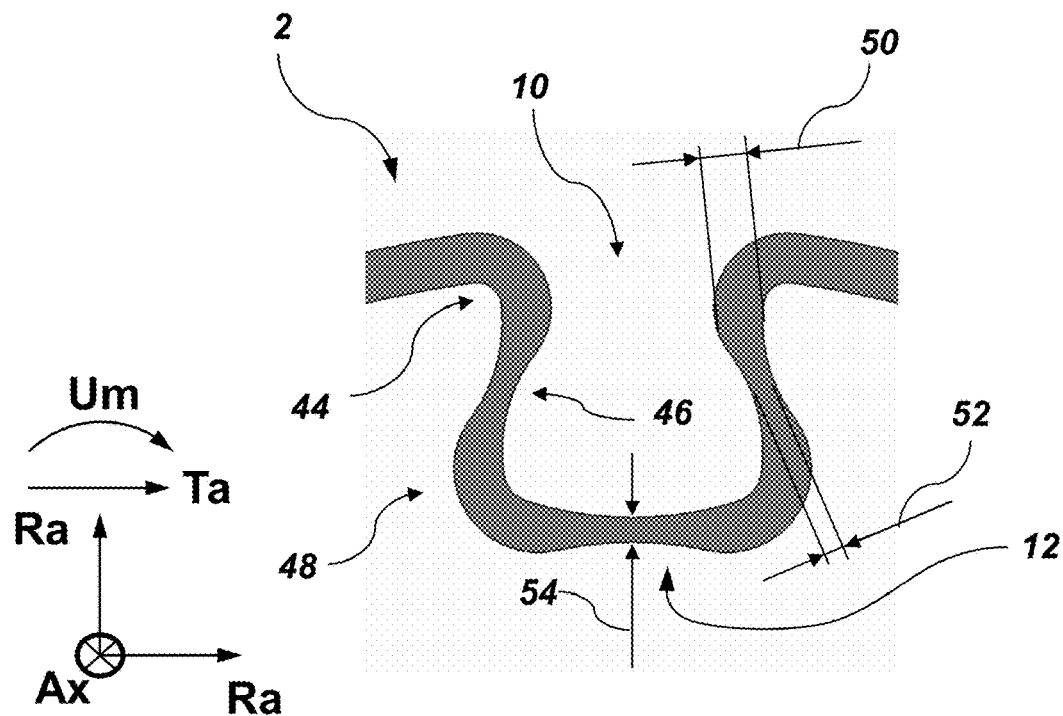
FIG. 10 is an enlarged detail of a deformation portion of the outer sleeve according to FIG. 7.
Figure 11:
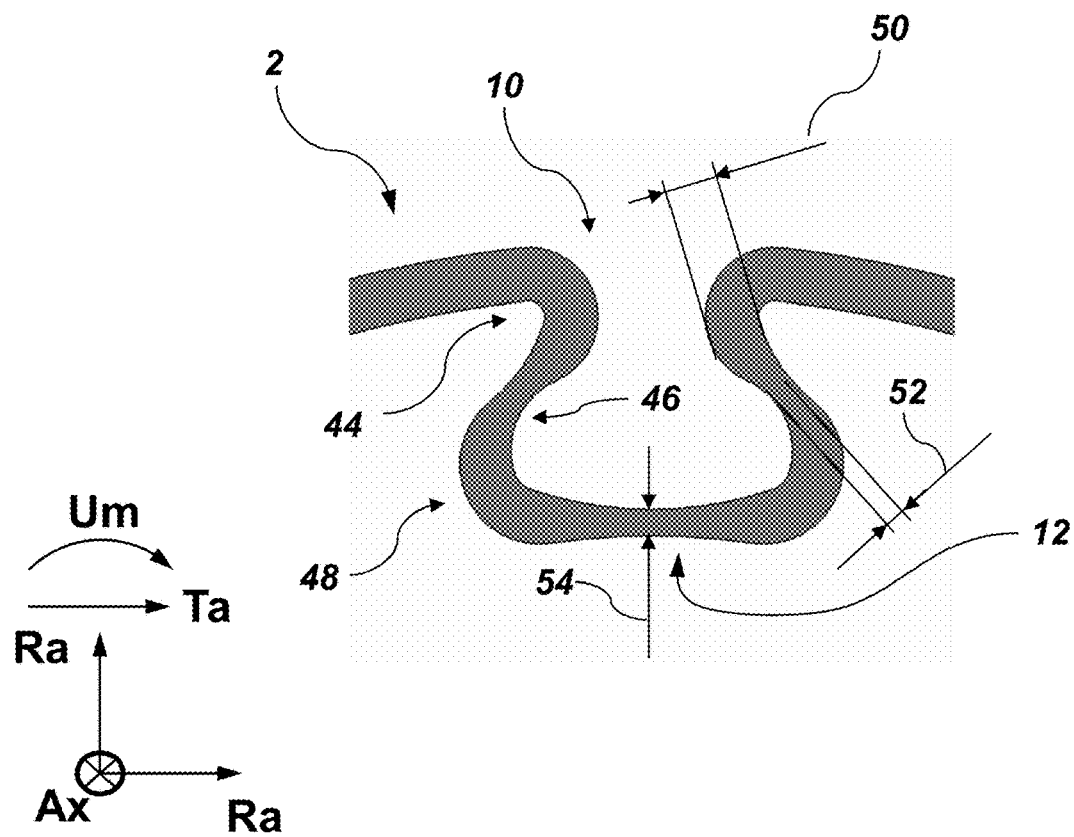
FIG. 11 is an enlarged detail of a deformation portion of the outer sleeve according to FIG. 8.

The diameter 34 of the calibrated outer sleeve 2 shown in FIGS. 8 and 9 is smaller than the diameter 36 of the uncalibrated outer sleeve 2 shown in FIG. 7. Furthermore, the diameter 20 of the calibrated outer sleeve 2 shown in FIGS. 8 and 9 is smaller than the distance 22 of the uncalibrated outer sleeve 2 shown in FIG. 7.

The radial distance 16 of the support-surface portion 12 functioning as a stop radially inwards towards the midpoint 18 of the calibrated outer sleeve 2 shown in FIGS. 8 and 9 is the same as the radial distance 16 radially inwards towards the midpoint 18 of the uncalibrated outer sleeve 2 shown in FIG. 7. The radial distance 16 has not been changed by the calibration, for example has not been reduced.

Figure 12:
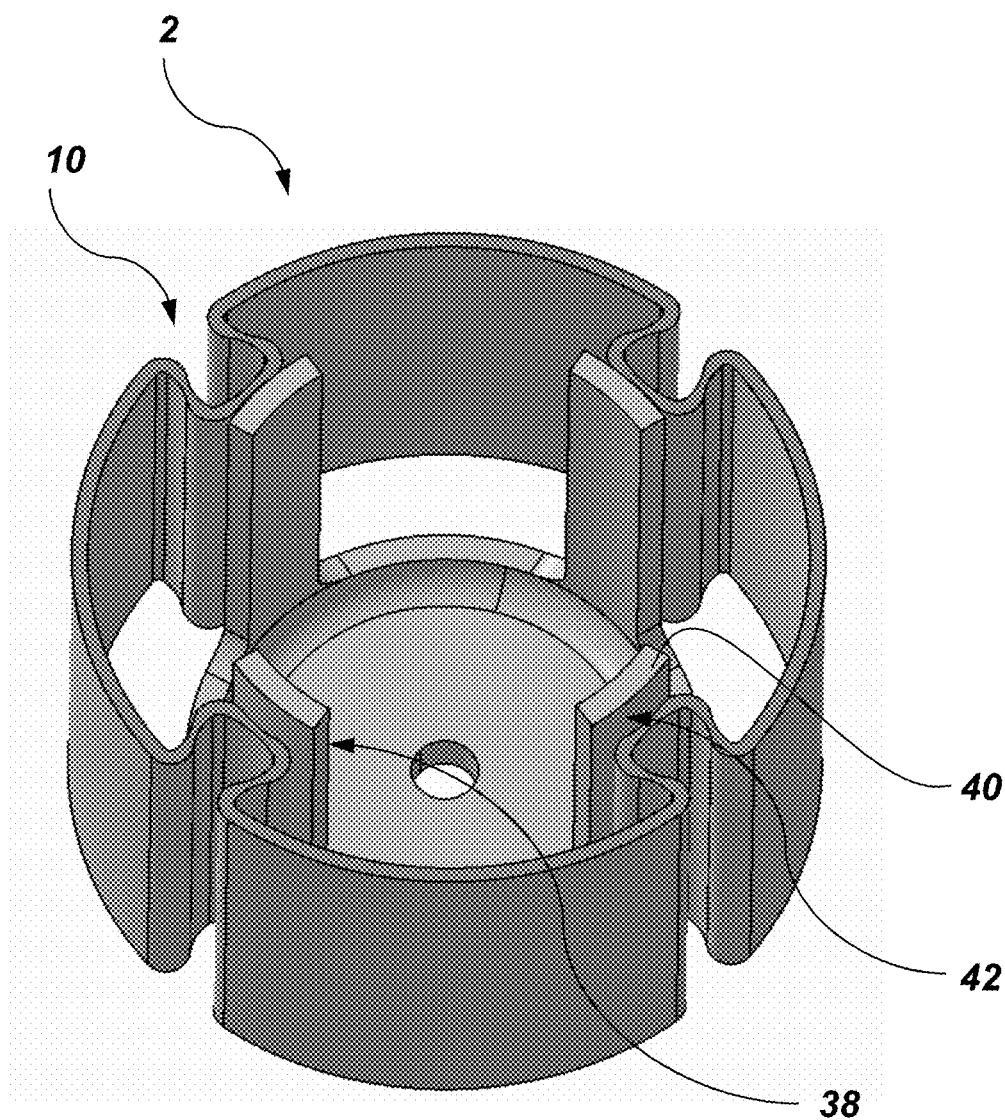
FIG. 12 is a three-dimensional view of the outer sleeve according to FIG. 7 with a counterholder abutting its support-surface portions.
Figure 12:
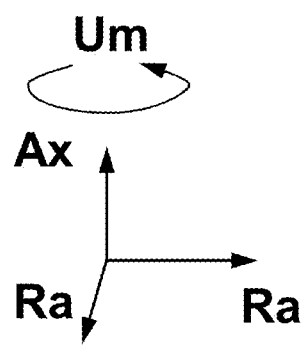

This may be achieved by means of a counterholder 38, which abuts the support-surface portions 12 during the calibration of the bearing 1, as shown symbolically in FIG. 12, in order to illustrate the position of the counterholder 38 in relation to the outer sleeve 2 and for example in relation to its support-surface portions 12.

As shown in the embodiment of the counterholder 38, the counterholder 38 may comprise four retaining fingers 40, corresponding to the number of deformation portions 10. A retaining-surface portion 42 may be formed on the retaining fingers 40, wherein an extension of the relevant retaining-surface portion 42 in the circumferential direction Um and/or in the axial direction Ax may correspond at least to the extension of the relevant support-surface portion 12 in the circumferential direction Um and/or in the axial direction Ax. The counterholder 38, such as its retaining finger 40, may preferably be designed to be stable such that the counterholder 38 can withstand a force during the calibration.

Furthermore, the targeted deformation of the outer sleeve 2 during the calibration can be promoted by the design of the deformation portions 10 described in the following.

As described above, the deformation portion 10 may comprise multiple-curvature portions 14, wherein the outer sleeve 2 comprises four pairs of multiple-curvature portions 14, as shown in the embodiments of the bearing 1.

According to the embodiments of the bearing 1, each multiple-curvature portion 14 may comprise a first curvature portion 44, an inflection-point portion 46 and a second curvature portion 48 curved in the opposite direction to the first curvature portion 44, wherein the first curvature portion 44 connects the circumferential portion 8 to the inflection-point portion 46 and the second curvature portion 48 connects the inflection-point portion 46 to the support-surface portion 12. In the inflection-point portion 46, a change of sign of the curvature of the curvature portions 44, 48 takes place, so to speak.

As shown, the first and/or the second curvature portion 44, 48 may each enclose a curvature angle of approximately 120° when viewed in plan view.

As also shown, the curvature angle of the first curvature portion 44 may be substantially the same as the curvature angle of the second curvature portion 48, wherein the inflection-point portion 46 may be substantially straight.

According to the embodiments of the bearing 1 shown, the relevant wall thickness 50 of the first curvature portion 44 and the second curvature portion 48 may be greater than a wall thickness 52 of the inflection-point portion and/or a wall thickness 54 of the support-surface portion.

As shown, the wall thickness 50 of the relevant curvature portion 44, 48 may become gradually thicker and then thinner, i.e. the relevant curvature portion 44, 48 may progress from a thicker to a thinner wall thickness and vice versa, i.e. the wall thickness 50 of the relevant curvature portion 44, 48 may thus not be stepped.

According to the embodiments of the bearing 1 shown, in the thickest region the wall thickness 50 of the relevant curvature portion 44, 48 may be approximately twice as thick as a region of the thinnest wall thickness 52 of the inflection-point portion and/or a region of the thinnest wall thickness 54 of the support-surface portion. The elastomer body 24 may be constructed to be thicker in the region of the second curvature portions 48 than in the region of the first curvature portions 44 and/or in the region of the inflection-point portions 46.

Preventing the distance 20 between the deformation portions 10 from "springing back" and therefore maintaining the distance 20, as shown in FIG. 9, which may be approximately equal to zero, can be achieved using the measures that have already been described above, including "over-compression", for example in an outer sleeve 2 made of metal, and/or joining the end regions 62 of the multiple-curvature portions 14 that are opposite one another in the circumferential direction by adhesive bonding and/or welding, for example ultrasonic welding in an outer sleeve 2 made of plastics material.

The distance 20 shown in FIG. 9 is minimally greater than zero. This is due to this being the only view of the outer sleeve 2 without other components of the bearing 1, wherein the distance 20 in the calibrated bearing 1 is generally closed by means of the elastomer coating. This is why the distance 20 in FIG. 9 is referred to as "approximately equal to zero".

What is claimed is:

1. A bearing, comprising:
   an inner sleeve;
   an outer sleeve, and
   an elastomer body, which resiliently interconnects the inner sleeve and the outer sleeve,
   wherein the outer sleeve comprises a circumferential portion and at least one deformation portion that is recessed radially inwards from the circumferential portion, and
   wherein the at least one deformation portion comprises a support-surface portion arranged so as to be offset radially inwards relative to the circumferential portion of the outer sleeve, wherein the support-surface portion extends substantially perpendicularly to a radial direction,
   wherein the outer sleeve is calibrated, and wherein during calibration, the support-surface portion is prevented from being displaced radially inwards by means of a counterholder, which abuts the support-surface portion.

2. The bearing according to claim 1, wherein the outer sleeve is covered substantially completely by the elastomer body at least on a radial inner face.

3. The bearing according to claim 1, wherein the support-surface portion, when viewed in cross section, extends substantially in a circumferential direction that is offset radially inwards relative to the circumferential portion and extends over an angular section of approximately 10° to approximately 45°.

4. The bearing according to claim 1, wherein the deformation portion further comprises:
   a pair of multiple-curvature portions, wherein each multiple-curvature portion comprises at least a first curvature portion, an inflection-point portion and a second curvature portion opposite the first curvature portion,
   wherein the first curvature portion connects the circumferential portion to the inflection-point portion and the second curvature portion connects the inflection-point portion to the support-surface portion.

5. The bearing according to claim 4, wherein the first curvature portion and the second curvature portion are formed to have a greater wall thickness than the inflection-point portion and/or the support-surface portion.

6. The bearing according to claim 4, wherein a distance between the multiple-curvature portions when the outer sleeve has been calibrated is shorter than a distance between the multiple-curvature portions when the outer sleeve has not been calibrated.

7. The bearing according to claim 4,
   wherein when the outer sleeve has been calibrated, a distance between the multiple-curvature portions that increases again after calibration due to the at least one deformation portion resiliently springing back is prevented by end regions of the multiple-curvature portions that are opposite one another in the circumferential direction being connected by adhesive bonding and/or welding when the outer sleeve has been calibrated.

8. The bearing according to claim 1, further comprising:
   an intermediate sleeve, which is designed as a damping mass,
   wherein the elastomer body comprises:
   at least one pair of outer suspension springs, which resiliently interconnects the intermediate sleeve and the outer sleeve, and
   at least one pair of inner suspension springs, which resiliently interconnects the intermediate sleeve and the inner sleeve,
   wherein the at least one pair of outer suspension springs and the at least one pair of inner suspension springs are arranged in a row in the radial direction.

9. The bearing according to claim 8, wherein the intermediate sleeve is formed in multiple parts and so as to be interrupted in the circumferential direction.

10. The bearing according to claim 9, wherein the multiple-part intermediate sleeve is calibrated and wherein an extent of calibration of the multiple-part intermediate sleeve is controllable by means of a width of a gap, measured in the circumferential direction, between intermediate sleeve parts.

11. The bearing according to claim 8,
    wherein the inner sleeve comprises at least one inner-sleeve stop, which projects radially outwards and limits a relative radial displacement of the inner sleeve and/or the intermediate sleeve, and
    wherein the at least one deformation portion and the inner-sleeve stop are arranged in a row in the radial direction.

12. An outer sleeve for a bearing,
    wherein the outer sleeve comprises a circumferential portion and at least one deformation portion that is recessed radially inwards from the circumferential portion, and
    wherein the at least one deformation portion comprises a support-surface portion arranged so as to be offset radially inwards relative to the circumferential portion of the outer sleeve, wherein the support-surface portion extends substantially perpendicularly to the radial direction,
    wherein the at least one deformation portion further comprises:
    a pair of multiple-curvature portions, wherein each multiple-curvature portion comprises at least a first curvature portion, an inflection-point portion and a second curvature portion opposite the first curvature portion, wherein the first curvature portion connects the circumferential portion to the inflection-point portion and the second curvature portion connects the inflection-point portion to the support-surface portion, and wherein the first curvature portion and the second curvature portion are formed to have a greater wall thickness than the inflection-point portion and/or the support-surface portion.

13. The outer sleeve according to claim 12, wherein the at least one deformation portion comprises two multiple-curvature portions, which are formed to be opposite one another in the circumferential direction and have a distance from one another in the circumferential direction.

14. A method for producing a bearing, comprising:
providing an inner sleeve;
providing an outer sleeve, wherein the outer sleeve comprises a circumferential portion and at least one deformation portion that is recessed radially inwards from the circumferential portion, wherein the at least one deformation portion comprises a support-surface portion arranged so as to be offset radially inwards relative to the circumferential portion of the outer sleeve, and wherein the support-surface portion extends substantially perpendicularly to a radial direction;
providing an elastomer body, which resiliently interconnects the inner sleeve and the outer sleeve,
inserting a counterholder between the outer sleeve and the inner sleeve such that the counterholder abuts the support-surface portion, and
calibrating the outer sleeve, wherein, by means of the counterholder, the support-surface portion is prevented from being displaced radially inwards.

15. A bearing, comprising:
an inner sleeve;
an outer sleeve, and an elastomer body, which resiliently interconnects the inner sleeve and the outer sleeve,
wherein the outer sleeve comprises a circumferential portion and at least one deformation portion that is recessed radially inwards from the circumferential portion, and
wherein the at least one deformation portion comprises a support-surface portion arranged so as to be offset radially inwards relative to the circumferential portion of the outer sleeve, wherein the support-surface portion extends substantially perpendicularly to a radial direction,
wherein the at least one deformation portion further comprises:
a pair of multiple-curvature portions, wherein each multiple-curvature portion comprises at least a first curvature portion, an inflection-point portion and a second curvature portion opposite the first curvature portion,
wherein the first curvature portion connects the circumferential portion to the inflection-point portion and the second curvature portion connects the inflection-point portion to the support-surface portion, and
wherein the first curvature portion and the second curvature portion are formed to have a greater wall thickness than the inflection-point portion and/or the support-surface portion.

16. A bearing, comprising:
an inner sleeve;
an outer sleeve, and
an elastomer body, which resiliently interconnects the inner sleeve and the outer sleeve,
wherein the outer sleeve comprises a circumferential portion and at least one deformation portion that is recessed radially inwards from the circumferential portion, and
wherein the at least one deformation portion comprises a support-surface portion arranged so as to be offset radially inwards relative to the circumferential portion of the outer sleeve, wherein the support-surface portion extends substantially perpendicularly to a radial direction,
wherein the at least one deformation portion further comprises a pair of multiple-curvature portions, wherein each multiple-curvature portion comprises at least a first curvature portion, an inflection-point portion and a second curvature portion opposite the first curvature portion,
wherein the first curvature portion connects the circumferential portion to the inflection-point portion and the second curvature portion connects the inflection-point portion to the support-surface portion,
wherein a distance between the multiple-curvature portions when the outer sleeve has been calibrated is shorter than a distance between the multiple-curvature portions when the outer sleeve has not been calibrated.

17. A bearing, comprising:
an inner sleeve;
an outer sleeve, and
an elastomer body, which resiliently interconnects the inner sleeve and the outer sleeve,
wherein the outer sleeve comprises a circumferential portion and at least one deformation portion that is recessed radially inwards from the circumferential portion, and
wherein the at least one deformation portion comprises a support-surface portion arranged so as to be offset radially inwards relative to the circumferential portion of the outer sleeve, wherein the support-surface portion extends substantially perpendicularly to a radial direction,
wherein the at least one deformation portion further comprises a pair of multiple-curvature portions, wherein each multiple-curvature portion comprises at least a first curvature portion, an inflection-point portion and a second curvature portion opposite the first curvature portion,
wherein the first curvature portion connects the circumferential portion to the inflection-point portion and the second curvature portion connects the inflection-point portion to the support-surface portion, and
wherein when the outer sleeve has been calibrated, a distance between the multiple-curvature portions that increases again after calibration due to the at least one deformation portion resiliently springing back is prevented by end regions of the multiple-curvature portions that are opposite one another in the circumferential direction being connected by adhesive bonding and/or welding when the outer sleeve has been calibrated.

18. A bearing, comprising:
an inner sleeve;
an outer sleeve, and
an elastomer body, which resiliently interconnects the inner sleeve and the outer sleeve,
wherein the outer sleeve comprises a circumferential portion and at least one deformation nation portion that is recessed radially inwards from the circumferential portion, and wherein the at least one deformation nation portion comprises a support-surface portion arranged so as to be offset radially inwards relative to the circumferential portion of the outer sleeve, wherein the support-surface portion extends substantially perpendicularly to a radial direction, wherein the bearing further comprises:

an intermediate sleeve, which is designed as a damping mass, wherein the elastomer body comprises:

at least one pair of outer suspension springs, which resiliently interconnects the intermediate sleeve and the outer sleeve, and at least one pair of inner suspension springs, which resiliently interconnects the intermediate sleeve and the inner sleeve, wherein the at least one pair of outer suspension springs and the at least one pair of inner suspension springs are arranged in a row in the radial direction.

\* \* \* \* \*